United States Patent
Bhatt

(10) Patent No.: US 9,715,751 B2
(45) Date of Patent: Jul. 25, 2017

(54) ZOOMING TO FACES DEPICTED IN IMAGES

(75) Inventor: Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 721 days.

(21) Appl. No.: 13/182,409

(22) Filed: Jul. 13, 2011

(65) Prior Publication Data

US 2013/0016255 A1  Jan. 17, 2013

(51) Int. Cl.
*G06T 11/60* (2006.01)
*G06T 3/40* (2006.01)

(52) U.S. Cl.
CPC ............... *G06T 11/60* (2013.01); *G06T 3/40* (2013.01)

(58) Field of Classification Search
USPC ...... 348/240.2, 240.99, 222.1, 240.3, 333.12
See application file for complete search history.

(56) References Cited

U.S. PATENT DOCUMENTS

| 5,991,429 | A | 11/1999 | Coffin et al. | |
|---|---|---|---|---|
| 7,564,994 | B1 | 7/2009 | Steinberg et al. | |
| 7,711,145 | B2 | 5/2010 | Gallagher | |
| 7,813,526 | B1 * | 10/2010 | Bourdev | 382/103 |
| 2002/0181784 | A1 * | 12/2002 | Shiratani | 382/218 |
| 2005/0046730 | A1 | 3/2005 | Li | |
| 2005/0147327 | A1 * | 7/2005 | Choi et al. | 382/299 |
| 2006/0222243 | A1 * | 10/2006 | Newell | H04N 1/3935 382/173 |
| 2007/0053585 | A1 * | 3/2007 | Xiao et al. | 382/159 |
| 2007/0098396 | A1 | 5/2007 | Watanabe et al. | |

(Continued)

FOREIGN PATENT DOCUMENTS

| EP | 1589478 A2 | 10/2005 |
|---|---|---|
| EP | 1850579 A2 | 10/2007 |
| EP | 2207342 A2 | 7/2010 |

OTHER PUBLICATIONS

PCT Notification of Transmittal of the International Search Report and the Written Opinion for Application No. PCT/US2012/046752 mailed Nov. 8, 2012, 10 pages.

(Continued)

*Primary Examiner* — Roberto Velez
*Assistant Examiner* — Stephen Coleman
(74) *Attorney, Agent, or Firm* — Fish & Richardson P.C.

(57) ABSTRACT

Methods, systems, and apparatus, including computer programs encoded on computer storage media, are described for zooming into a portion of an image that is associated with a specified feature, for example, a portion of an image that depicts a human or an animal face. In one aspect, the subject matter described in this specification can be embodied in methods that include the actions of receiving user input requesting to zoom to faces depicted in one or more digital images, where the faces include either human faces or animal faces. Additionally, in response to said receiving the user input and for each of the one or more digital images, the methods include the actions of presenting a zoomed view of the digital image that shows an instance of a face depicted in the digital image, such that the zoomed view is presented at a zoom-level that is selected (i) to be less than or equal to a predetermined zoom-level and (ii) to maximize a fraction occupied by the depicted instance of the face within the zoomed view of the digital image.

33 Claims, 14 Drawing Sheets

(56) References Cited

U.S. PATENT DOCUMENTS

| | | | |
|---|---|---|---|
| 2007/0285534 A1* | 12/2007 | Makioka | 348/240.99 |
| 2008/0226140 A1* | 9/2008 | Okamura | 382/118 |
| 2009/0100333 A1* | 4/2009 | Xiao | G06T 11/60 715/252 |
| 2009/0148071 A1* | 6/2009 | Ohwa et al. | 382/306 |
| 2009/0268943 A1 | 10/2009 | Yoshizumi | |
| 2010/0079623 A1* | 4/2010 | Tomita | 348/240.99 |

OTHER PUBLICATIONS

PCT Notification Concerning Transmittal of International Preliminary Report on Patentability for Application No. PCT/US2012/046752 mailed Jan. 23, 2014, 7 pages.

\* cited by examiner

ZOOMING TO FACES DEPICTED IN IMAGES

BACKGROUND

This document relates to zooming into a portion of an image that is associated with a specified feature, for example, a portion of an image that depicts a human or an animal face.

A user of a digital image viewer application can provide manual input requesting the image viewer to zoom into an image displayed in a viewing region. For example, the user can provide the input by placing a cursor at a desired location of the image or by touching the desired location of the image. Upon receiving this type of location specific input from the user, the viewer application can zoom into the location of the image where input was provided by the user. In this manner, if the user then wants to zoom into other desired locations either on the same image or on other images that are concurrently displayed in the viewer, the user typically provides additional inputs at the other desired locations, respectively, in a sequential manner.

As another example, the user can provide an input to zoom into multiple images displayed in the viewing region via a user interface control associated with the viewer application, e.g. a menu item, a control button, and the like. Upon receiving such input from the user, the viewer application zooms into the center of the multiple images, respectively.

SUMMARY

Technologies described in this specification can be used to quickly compare multiple persons' faces in an image and instances of a same person's face across multiple images. In some implementations, a user can be presented with a zoomed view of each face in an image, and thus can examine attributes of faces depicted in the images. For example, using the zoomed views described in this specification, a user can determine which faces in the image are in focus or otherwise desirable. In other implementations, the described technologies can be used to compare instances of a person's face across multiple images. In this manner, while viewing multiple images side-by-side, the user can zoom into multiple instances of a particular person's face and, at this zoom level, the user can determine, for example, which of the multiple instances of the particular person's face are better than the others, for example, one image may be in focus while one or more of the other images may be out of focus.

In general, one aspect of the subject matter described in this specification can be embodied in methods that include the actions of receiving user input requesting to zoom to faces depicted in one or more digital images, where the faces include either human faces or animal faces. Additionally, in response to receiving the user input and for each of the one or more digital images, the methods include the actions of presenting a zoomed view of the digital image that shows an instance of a face depicted in the digital image, such that the zoomed view is presented at a zoom-level that is selected (i) to be less than or equal to a predetermined zoom-level and (ii) to maximize a fraction occupied by the depicted instance of the face within the zoomed view of the digital image.

The foregoing and other implementations can each optionally include one or more of the following features, alone or in combination. In some implementations, the predetermined zoom-level can be 100%. Further, the detected instance of the face can be centered in the zoomed view of the digital image. In some implementations, for each of the one or more digital images, the methods can include the actions of detecting an instance of at least one face depicted in the digital image upon receiving the user request. In other implementations, for each of the one or more digital images, the methods can include the actions of detecting an instance of at least one face depicted in the digital image prior to receiving the user request.

In some implementations, the one or more digital images can include one digital image, the digital image can depict faces of two or more persons, and the methods can include the actions of switching, in response to receiving another user input, from presenting the zoomed view that shows the depicted face of a person at the zoom-level that was selected (i) to be less than or equal to the predetermined zoom-level and (ii) to maximize the fraction occupied by the depicted person's face within the zoomed view of the digital image, to presenting another zoomed view of the digital image that shows the depicted face of another person at another zoom-level that is selected (i) to be less than or equal to the predetermined zoom-level and (ii) to maximize the fraction occupied by the depicted other person's face within the other zoomed view of the digital image.

In some implementations, an order of sequentially presenting the two or more zoomed views corresponding to the faces of the two or more persons depicted in the digital image is different from a detection order of the two or more faces. For example, the order of sequentially presenting the two or more zoomed views corresponding to the faces of the two or more persons depicted in the digital image can be based on identity of the persons. As another example, the order of sequentially presenting the two or more zoomed views corresponding to the faces of the two or more persons depicted in the digital image can be based on size of the depicted faces.

In some implementations, the one or more digital images can include two or more digital images, each of the two or more digital images can depict faces of two or more persons, and the zoomed views of the two or more digital images can be presented concurrently. In these implementations, in response to receiving another user input, the methods can include the actions of switching, from concurrently presenting the zoomed views of the two or more digital images, such that each of the zoomed views is presented to show the depicted instance of the face of a person at the zoom-level that was selected (i) to be less than or equal to the predetermined zoom-level and (ii) to maximize the fraction occupied by the depicted instance of the person's face within the zoomed view of the digital image, to concurrently presenting other zoomed views of the two or more digital images, such that each of the other zoomed views is presented to show the depicted instance of the face of another person at another zoom-level that was selected (i) to be less than or equal to the predetermined zoom-level and (ii) to maximize the fraction occupied by the depicted instance of the other person's face within the other zoomed view of the digital image. Further, concurrently presenting zoomed views of the two or more digital images corresponding to the two or more instances of the person's face depicted in the two or more digital images can be based an instance of the person's face in a particular image of the two or more digital images. For example, the particular image can be user specified. As another example, the particular image can be an image from among the plurality of digital images that has a largest quantity of detected faces. In some implementations, for each of the digital images, the zoomed view of the digital image is displayed in a predetermined region of a user interface.

According to another aspect, the subject matter can also be implemented in methods that include the actions of receiving user input requesting to zoom into portions that have a specified feature in one or more digital images. In response to receiving the user input and for each of the one or more images, the methods can include the actions of detecting at least one image portion having the specified feature, and presenting a zoomed view of the image that shows the detected image portion having the specified feature at a zoom level that is selected (i) to be less than or equal to a predetermined zoom-level and (ii) to maximize a fraction occupied by the detected image portion having the specified feature within the zoomed view of the image.

The foregoing and other implementations can each optionally include one or more of the following features, alone or in combination. In some implementations, the specified feature can be that the image portion depicts an object, and detecting the image portion having the specified feature can include detecting an object depicted in one of the images, and selecting a portion of the image bounding the detected object to be the image portion depicting the object. For example, the object can be a human face. As another example, the object can be an animal face. As yet another example, the object can be one of a building or at a vehicle. In some implementations, the specified feature can be that the image portion includes a focus location of a camera that acquired the one or more images. In some implementations, the specified feature is that the image portion includes a predetermined image location. For example, the predetermined image location can be an image location to which the user zoomed during a previous viewing of the image. As another example, the predetermined image location can be any one of the centers of quadrants of the image. Further, the predetermined zoom-level is 100%. Furthermore, the detected image portion having the specified feature can be centered in the zoomed view of the image. In some implementations, for each of the images, the zoomed view of the image can be displayed in a corresponding predetermined region of a user interface.

In some implementations, the one or more images includes one image, the image can include two or more image portions having the specified feature. In these implementations, the method further includes the actions of switching from presenting the zoomed view that shows the detected image portion having the specified feature at the zoom-level that was selected (i) to be less than or equal to the predetermined zoom-level and (ii) to maximize the fraction occupied by the detected image portion having the specified feature within the zoomed view of the image, to presenting another zoomed view of the image that shows another detected image portion having the specified feature at another zoom-level that is selected (i) to be less than or equal to the predetermined zoom-level and (ii) to maximize the fraction occupied by the other detected image portion having the specified feature within the other zoomed view of the image. In some implementations, the one or more images can include two or more images, each of the two or more images can include two or more image portions having the specified feature, and the respective zoomed views of the two or more images can be presented concurrently. In these implementations, the methods can include the actions of switching from concurrently presenting the respective zoomed views of the two or more images, such that each of the zoomed views is presented to show the detected instance of the image portion having the specified feature at the zoom-level that was selected (i) to be less than or equal to the predetermined zoom-level and (ii) to maximize the fraction occupied by the detected instance of the image portion having the specified feature within the zoomed view of the image, to concurrently presenting respective other zoomed views of the two or more images, such that each of the other zoomed views is presented to show the detected instance of anther image portion having the specified feature at another zoom-level that was selected (i) to be less than or equal to the predetermined zoom-level and (ii) to maximize the fraction occupied by the detected instance of the other image portion having the specified feature within the other zoomed view of the image.

According to another aspect, the subject matter can also be implemented in a non-volatile computer storage medium encoded with a computer program. The program includes instructions that when executed by one or more computers cause the one or more computers to perform operations including receiving a specification of a feature associated with a portion of an image displayed in a predetermined region of a user interface. In response to receiving the specification, the operations further include displaying a zoomed view of the image to show an image portion that includes the specified feature, the zoomed view being displayed in the predetermined region of the user interface at a zoom-level that is selected (i) to be no larger than a predetermined zoom-level and (ii) to maximize a fraction occupied by the image portion within the predetermined region of the user interface.

The foregoing and other implementations can each optionally include one or more of the following features, alone or in combination. In some implementations, the predetermined zoom-level can be 100%. In some implementations, the detected image portion can be centered in predetermined region of the user interface. In some implementations, the operations further include detecting the image portion that includes the specified feature upon receiving the specification. In other implementations, the operations further include detecting the image portion that includes the specified feature prior to receiving the specification.

Particular implementations of the subject matter described in this specification can be configured so as to realize one or more of the following potential advantages. The described techniques enable a user to compare multiple faces detected in an image among each other, e.g., to determine a quality/characteristic that is common to each of the multiple detected faces. In this manner, the user can examine each of the faces detected in the image on an individual basis. Additionally, the user can compare multiple instances of a same person's face that were detected over respective multiple images, e.g., to determine an attribute that is common to each of the multiple detected instances of the person's face across the multiple images.

Moreover, the described technologies can be used to display zoomed views of two or more portions of an image that are in focus to allow a user to quickly assess whether or not content of interest is depicted in the image portions shown in the zoomed views. In addition, the systems and processes described in this specification can be used to concurrently display, at high zoom-level, predetermined image portions from a plurality of images. An example of such predetermined portion is (a central area of) an image quadrant. This enables a user to determine a content feature that appears in one or more of the four quadrants of an image, or whether the content feature appears in one or more instances of a quadrant of multiple images, for instance.

The disclosed techniques can also be used to quickly examine, at high zoom-level and within an image or across multiple images, image portions to which the user has zoomed during previous viewings of the image(s). For example, one or more points where the user zoomed a given image can be stored and later the user can choose to return to previous zoom locations. In some implementations one or more zoom points are saved without the users having to explicitly mark them. In other implementations, the user explicitly marks points on the image that should be zoomed to later on.

Details of one or more implementations of the subject matter of this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
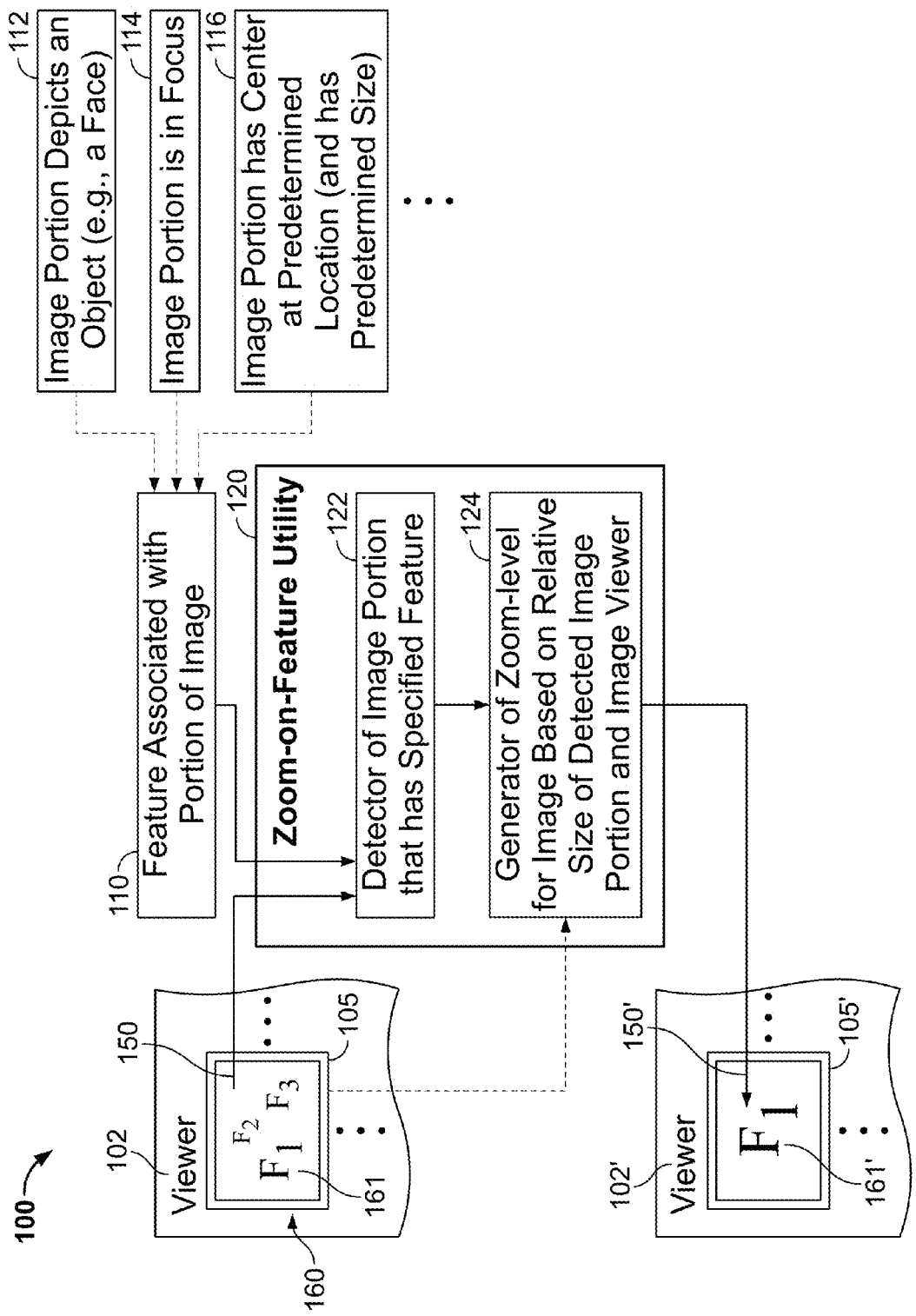
FIGS. 1A and 1B illustrate aspects of a system that zooms into an image portion that has a specified feature.

FIG. 1A illustrates a system 100 that zooms into image portions that have a specified feature. The system 100 can be implemented as part of an image processing application executed by a computer system. The system 100 can include a user interface that provides controls and indicators that can be used by a user associated with the image processing application to select one or more images for viewing and to specify how to view the selected image(s). The system 100 can also include a plurality of utilities that carry out under-the-hood processing to generate the specified views of the selected image(s).

The user interface of the system 100 can include a viewer 102 that displays at least one image 150. The image 150 can be displayed in a predetermined region of the viewer 102, for example in a panel 105. A view of the image 150 presented in the panel 105 corresponds to a zoom-level determined by the relative size of the image 150 with respect to the panel 105. For example, if the size of panel 105 is $(1/6)^{th}$ of the size of the image 150, then the zoom-level corresponding to viewing the full image 150 in the panel 105 is about 17%. Other images can be displayed in the viewer 102 in respective other panels, as indicated by the ellipses in the horizontal and vertical directions.

The plurality of utilities of the system 100 can include a zoom-on-feature utility 120. The zoom-on-feature utility 120 can receive as input the image 150 selected by the user and a specification 110 of a feature F associated with a portion of the image 150. In the image 150, first, second and third image portions 160, each of which having the specified feature F, are denoted by F1, F2 and F3, respectively. For example, the feature F can be specified by the user of the image processing application, by selecting the feature F from among a set of available features, as described below. As another example, the feature F can be specified programmatically. In some implementations, the zoom-on-feature utility 120 can output views of the received image 150, such that each of the views is generated to maximize a fraction within the view which is occupied by the image portion that has the user specified feature 110. In other implementations, the zoom-on-feature utility 120 can output views of the received image 150 that show the image portions which have the user specified feature 110 at a predetermined zoom-level, e.g. 100%.

In some implementations, the specified feature 112 of an image portion is that the image portion depicts an object. For example, the object depicted in the image portion can be a human face, an animal face, or in short, a face. Example implementations of the zoom-on-feature utility 120 described below in connection with FIGS. 2A-2C and 3A-3C correspond to cases for which the user specifies that the zoom-on-feature utility 120 zooms into a portion of an image 150 if the image portion depicts a face. As another example, the depicted object can be a vehicle, a building, etc.

In other implementations, the specified feature 114 of an image portion is that the image portion is in focus. Implementations of the zoom-on-feature utility 120 described below in connection with FIGS. 4A-4C correspond to cases for which the user specifies that if a portion of an image includes a focus location, then the zoom-on-feature utility 120 zooms into the image portion. In some other implementations, the specified feature 116 of an image portion is that the image portion includes a predetermined image location/pixel. For example, predetermined locations can be respective centers of the $1^{st}$, $2^{nd}$, $3^{rd}$ and $4^{th}$ quadrants of the image. As another example, a predetermined location/pixel of an image can be the location/pixel to which the user selected to zoom during a most recent view of the image. In the latter example, the system 100 can track/record these previously zoomed portions of the image. The system 100 can record previous zoom points automatically or in response to a user's instruction.

In general, a zoomed view of the received image 150 is generated based on the specified feature 110, by various modules of the zoom-on-feature utility 120, to maximize a fraction within the zoomed view which is occupied by the image portion that has the user specified feature 110. In FIG. 1A, these various modules include a detector 122 of an image portion that has the specified feature, and a generator 124 of a zoom-level for presenting the zoomed view. A zoomed view of the received image 150 can be presented by the zoom-on-feature utility 120 in the panel 105' of the viewer 102' (the "prime" represents subsequent instances/states of the panel 150 and of the viewer 102, respectively.) For example, an image portion 161 represents a first portion of the image 150 that has the specified feature F. A zoomed view of the image 150' is generated by the zoom-on-feature utility 120 to show the image portion 161' at a zoom-level selected to maximize a fraction occupied by the image portion 161' within the zoomed view of the image 150'. The zoom-level for presenting the zoomed view of the image 150' is determined by the zoom-on-feature utility 120, at least in part, based on the relative size of the image portion 160 and the panel 105. In addition, zoomed views of the image 150 that show the other image portions F2 and F3 which have the specified feature F can be generated by the zoom-on-feature utility 120 at corresponding zoom-levels selected to maximize fractions of the image portions F2 and F3 within the zoomed views. In some implementations, zoom-levels for presenting the generated zoomed views can be capped at 100%.

The zoom-on-feature utility 120 accesses the image 150 and obtains the specification 110 of the feature F either from the user or from storage. The detector 122 detects the set 160 of portions F1, F2 and F3 of the image 150, each of which having the specified feature F. In the implementations for which the specified feature 112 is that a portion of the image 150 depicts a face, the detector 122 represents a face detector. One or more face detectors can be used from among face detectors that are known in the art. The one or more face detectors can detect a first face in the image portion denoted F1, a second face in the image portion denoted F2, a third face in the image portion denoted F3, and so on. In some implementations, the image portion associated with a detected face can be defined as a rectangle that substantially circumscribes the face. In other implementations, the image portion associated with a detected face can be defined to be an oval that substantially circumscribes the face. Note that as the faces detected in the image 150 can have different sizes (e.g., the first face is the largest and the second face is the smallest of the detected faces in the image 150) the image portions F1, F2 and F3 corresponding to the respective detected faces also can have different sizes. In some instances, however, the face detector 122 can detect the set 160 of portions F1, F2 and F3 of the image 150, each of which depicting a face, prior to displaying the image 150 in the panel 105 of the viewer 102. In such instances, the zoom-on-feature utility 120 can access and retrieve the previously detected set 160 of portions F1, F2 and F3 of the image 150, each of which depicting a face, without having to generate it on the fly.

In implementations for which the specified feature 114 is that a portion of the image 150 is in focus, the detector 122 can access metadata associated with the image 150, for example, to retrieve first, second and third focus locations associated with the image 150. Once the focus locations are retrieved in this manner by the detector 122, the zoom-on-feature utility 120 can account for in-focus image portions F1, F2 and F3 of the image 150 as the respective image portions centered on the retrieved focus locations. In another example, the detector 122 is configured to detect a set 160 of portions F1, F2, F3 of the image 150 that are in focus by actually analyzing the content of the image 150 using at least one or more from among detectors of in-focus-content which are known in the art.

In the implementations for which the specified feature 116 is that a portion of the image 150 includes a predetermined image location, the detector 122 can access metadata associated with the image 150 to retrieve first, second and third predetermined locations associated with the image 150, for example, centers of the $1^{st}$, $2^{nd}$, $3^{rd}$ and $4^{th}$ quadrants of the image. As another example, the predetermined locations can be image locations to which the user selected to zoom during a most recent view of the image 150. Once the predetermined locations are retrieved by the detector 122 as described above, the zoom-on-feature utility 120 can account for respective portions F1, F2 and F3 of the image 150 that include the retrieved predetermined locations.

The set 160 of image portions F1, F2 and F3 that were detected to have the specified feature F are input to the zoom-level generator 124. In some implementations, the zoom-level for presenting the zoomed view of the image 150' in the panel 105' can be generated based on the relative size of the detected image portion 161 and the size of the panel 105 in which the image 150 is displayed. These implementations of the zoom-level generator 124 are applicable, for example, when the specified feature 112 is that a portion of the image 150 depicts a human face or an animal face.

Figure 1B:
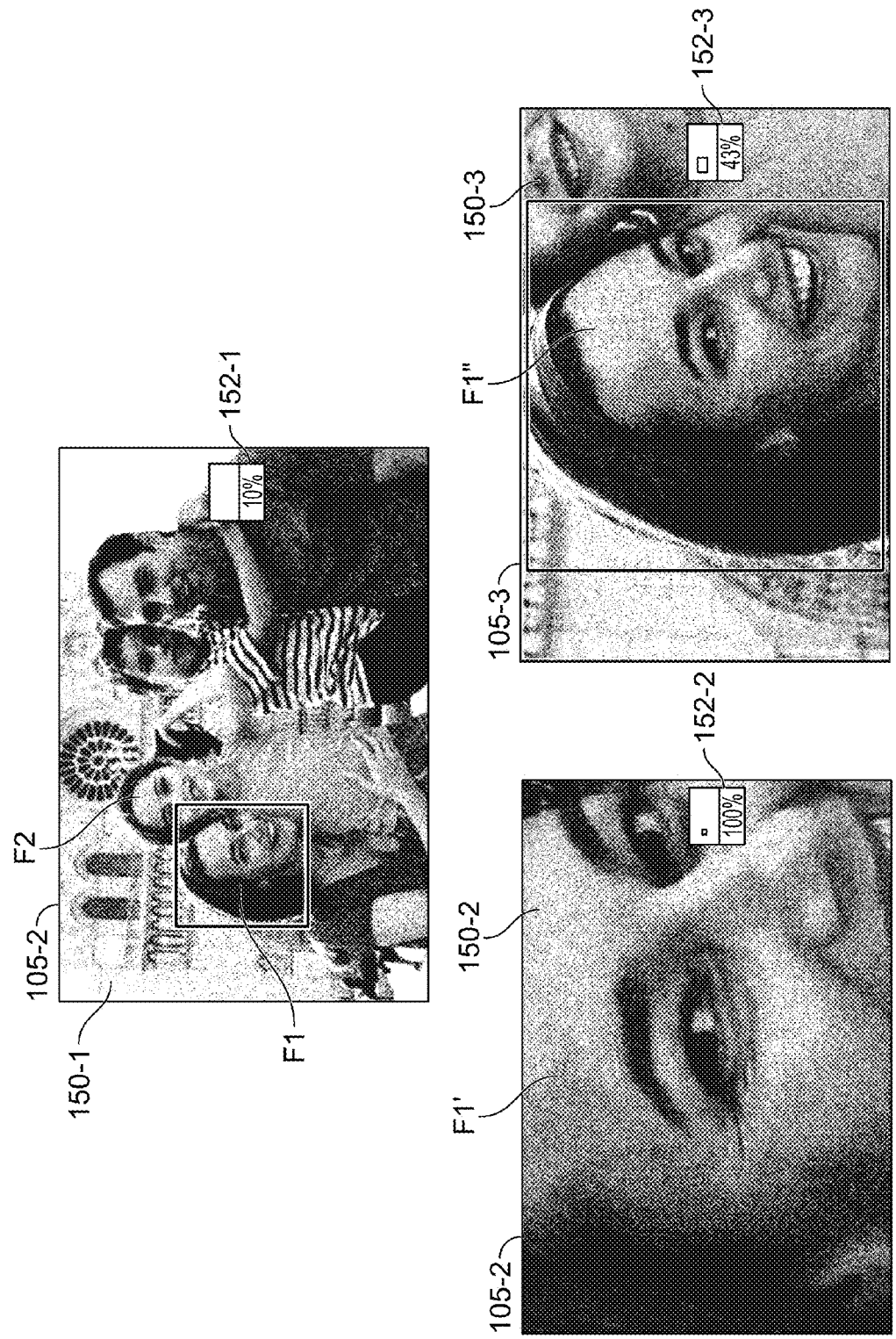

FIG. 1B shows a view of an image 150-1 that depicts faces of multiple persons. In this case, a zoom-level 152-1 corresponding to the view of the image 150-1 as displayed in a panel 105-1 is 10%. (The index 1 of the panel 105-1 denotes a first instance of the panel 105.) The face detector 122 detected multiple regions of the image F1, F2, ..., each of which depicting a face. For example, region F1 depicts the face of a first person, and is bounded by a rectangle.

In some implementations, the zoom-level generator 124 can be configured to generate a zoomed view of the image 150-2 at a zoom-level 152-2 of 100% and to display the zoomed view 150-2 in the same panel 105-2. (The index 2 of the panel 105-2 denotes a second instance of the panel 105.) To generate the image view 150-2 in FIG. 1B, the zoom-level generator 124 magnified the image view 150-1 by 10. However, in this case, an instance of the region F1' depicting the first person's face cannot fit in the panel 105-2 at the zoom-level 152-2. Accordingly, the zoomed view 150-2 having a zoom-level 152-2 of 100% cannot be used to evaluate the entire face of the first person.

In other implementations, the zoom-level generator 124 is configured to fit the bounding box of the region F1 that depicts the first person's face to (at least) one of the dimensions of the panel 105-3. (The index 3 of the panel 105-3 denotes a third instance of the panel 105.) The zoom-view 150-3 that fits the height of the bounding box of an instance of the region F1" to the height of the panel 105-3 is displayed at a zoom-level 152-3 of 43%. To generate the image view 150-3 in FIG. 1B, the zoom-level generator 124 magnified the image view 150-1 by about 4. A user of the system 100 can use the zoomed view 150-3, to evaluate the first person's face, because the entire face of the first person is visible in this zoomed view 150-3 at a zoom-level 152-3 that is four times larger than the zoom-level 152-1 of the image view 150-1.

When determining the zoom-factor, the zoom-level generator 224 can be configured to apply padding between the rectangle bounding a region Fj depicting a face and the edges of the panel to provide an aesthetically pleasing zoom-view. Additionally, the zoom-level generator 124 can be configured to cap a zoom-level of generated zoomed views at 100%. The latter configuration can be implemented in order to avoid situations when a zoom-level would exceed 100% for a zoomed view generated to fit a rectangle that bounds a region Fj depicting a face (e.g. in the case of a face "j" that occupies a small fraction of an image.)

Referring again to FIG. 1A, the zoom-level for presenting the zoomed view of the image 150' in the panel 105' can be generated to be a predetermined zoom-level, e.g., 100% (or another specified zoom-level that is less than 100%.) The zoom-level generator 124 can select a predetermined zoom-level, for example, when receiving a user input to zoom the image 150 into a portion of the image 161 that is in focus (e.g., if image portion 161 includes a focus location) or, in another example, into a portion of the image 150 that includes a predetermined image location (e.g., the image portion 161 to which a user has zoomed during a previous viewing of the image 150.)

A user of the image processing application associated with the system 100 can examine the zoomed views of the image 150' as generated by the zoom-on-feature utility 120 and displayed in the panel 105' of the viewer 102'. By individually viewing the image portions 160 of the image 150 at highest respective zoom-levels in panel 105', as described above, the user can assess quality of content associated with the specified feature F more accurately and faster than if the user were to perform this assessment by viewing the image 150 in the panel 105 of viewer 102. The former way to assess content quality is more accurate because the zoom-on-feature utility 120 automatically detects and zooms into the portions of the image 150 having the specified feature, and thus the chance to miss some of these image portions having the feature is reduced compared to when the user manually detects and zooms to the detected features. In addition, the foregoing assessment process is faster because the tile and zoom utility 120 automatically detects and zooms into all the portions 160 of the image 150 having the specified feature F, and thus the time taken by a user who would have to manually search for and then zoom into the portions of the image 150 that have the specified feature is reduced. Example implementations of the tile and zoom utility 120 are described below.

Figure 2A:
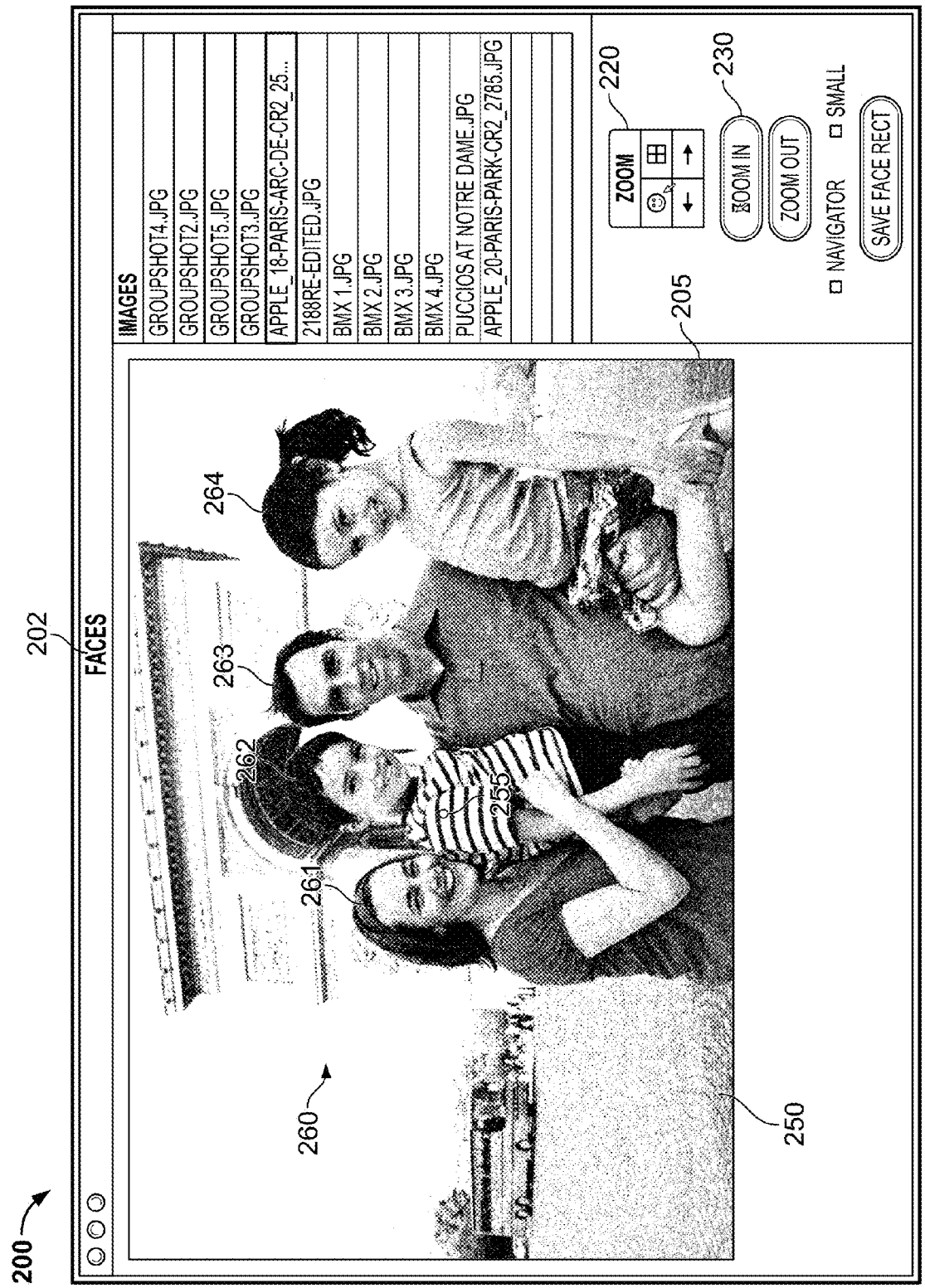
FIGS. 2A-2C show aspects of a system that zooms into a portion of an image corresponding to a face detected in an image.
Figure 2B:
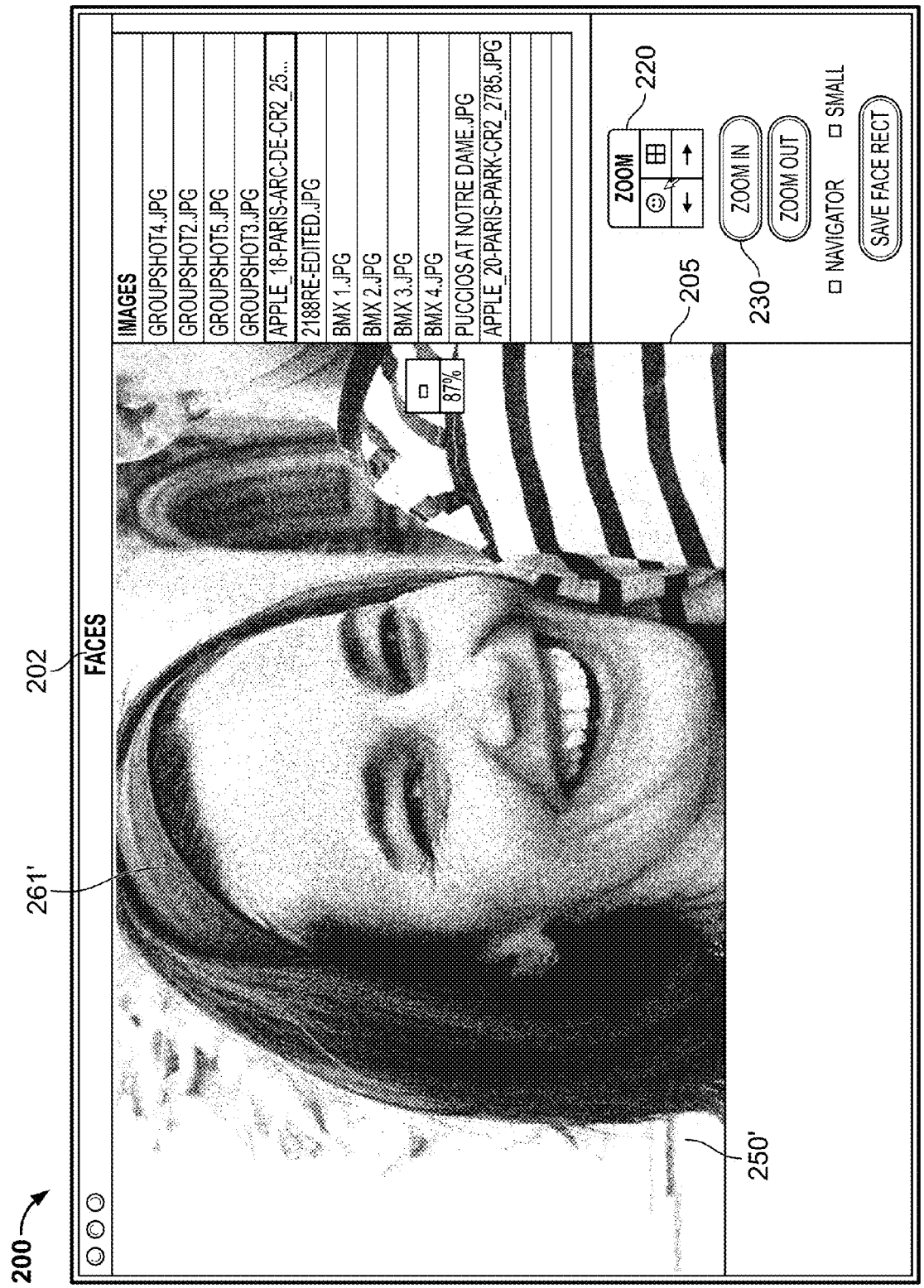
Figure 2C:
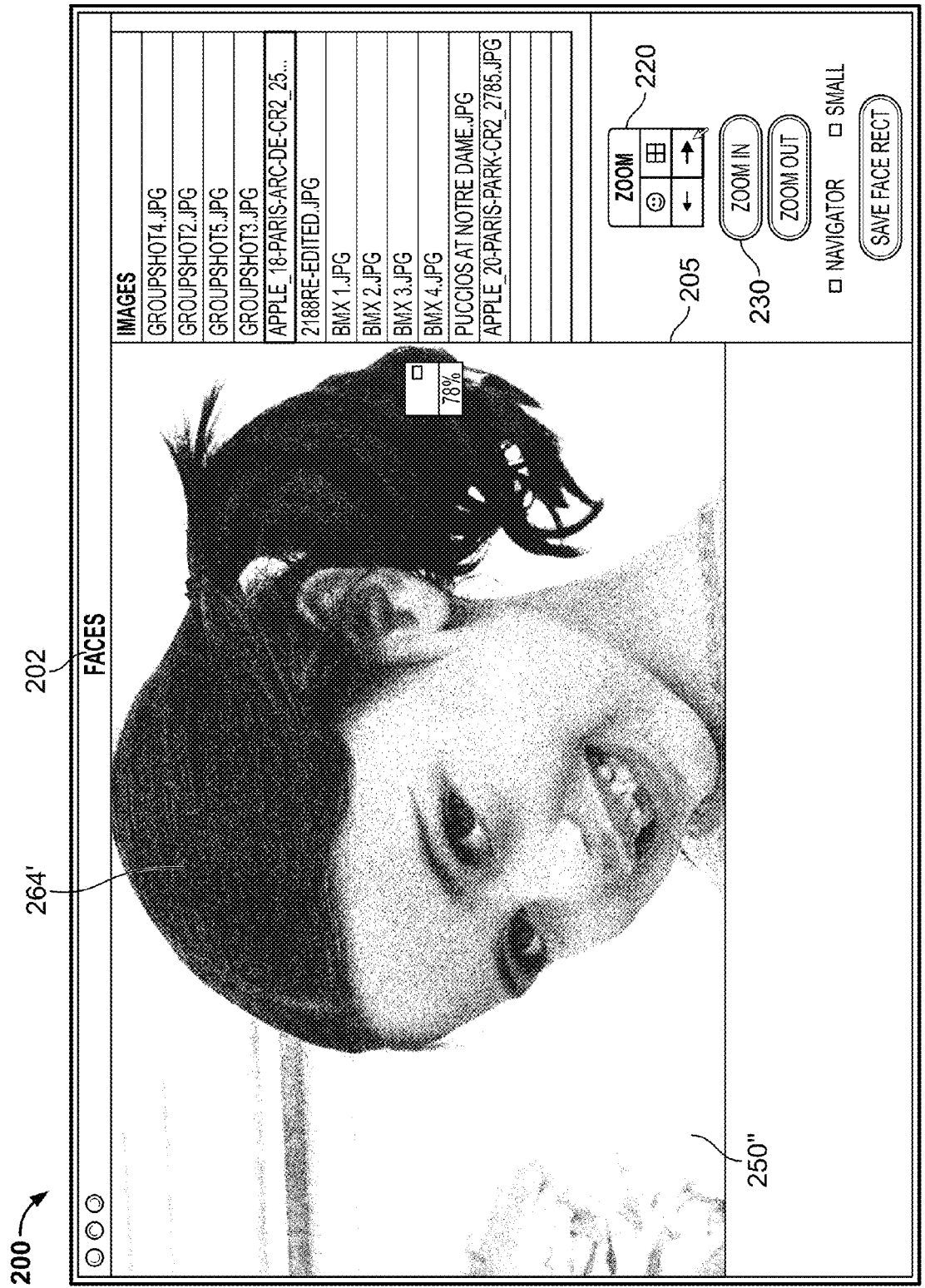

FIGS. 2A-2C show aspects of a system 200 that zooms into a portion of an image corresponding to a face detected in an image 250. The system 200 can be implemented, for example, as part of an image processing application. Further, the system 200 can correspond to the system 100 described above in connection with FIG. 1A for the case when the specified feature of an image portion is that the image portion depicts a human face or an animal face.

The system 200 can include a graphical user interface (GUI) 202. The GUI 202 can present to a user associated with the system 200 a panel 205 used to display the image 250. In some implementations, the GUI 202 can include a control 230 to enable the user to zoom to the center of the image 255. Note that in FIG. 2A, zooming the image 250 at high zoom-level into the image center 255 may expose image content that has only marginal viewing value (in this case a person's shoulder). In some implementations, the GUI 202 enables the user to specify a location of the image 250 displayed in the panel 205, by using a cursor or a touch gesture, to prompt the system 200 to zoom into a portion of the image 250 centered at the specified location of the image 250 entered by the user.

It would be desirable to present zoomed views of multiple human and/or animal faces depicted in the image 250 to allow a user associated with the system 200 to determine which of the multiple faces are in focus or otherwise desirable. To this effect, the GUI 202 can also include a control 220 through which the user can request that the system 200 zooms to portions 260 of the image 250 depicting a face.

In response to receiving the request, the system 200 detects the multiple faces depicted in the image 250. In some instances, however, in response to receiving the user request, the system 200 obtains the multiple faces depicted in the image 250 that were detected prior to displaying the image 250 in the panel 205. In such instances, the system 200 can access and retrieve the previously detected faces without having to detect them on the fly. Then, the system 200 presents zoomed views of the image 250 that show respective image portions 260 corresponding to the multiple detected faces. In some implementations, a contour of an image portion 261 (e.g., a rectangle) inscribing a person's face can be specified (with a cursor, a touch gesture or a multi-touch gesture) by the user associated with the system 200. The system 200 can then present a zoomed view of the image 250 that shows the specified image portion 261 inscribing the face of the person depicted in the image 250.

In the example illustrated in FIG. 2A, a view of the image 250 presented in the panel 205 shows a first person's face depicted in an image portion 261, a second person's face depicted in an image portion 262, a third person's face depicted in an image portion 263, and a fourth person's face depicted in an image portion 264. The system 200 presents the view of the image 250 in the panel 205 at a particular zoom-level given by a ratio of the size of panel 205 to the size of image 250. The system 200 can obtain the set 260 of previously or on the fly detected image portions that depict respective faces. The system 200 can then replace a view of the image 250 presented in the panel 205 at the particular zoom-level with a zoomed view of the image 250' that shows a person's face depicted in the image portion 261' at a zoom-level that is larger than the particular zoom-level, as illustrated in FIG. 2B. The larger zoom-level corresponding to the zoomed view of the image 250' is determined by the system 200 to maximize a fraction occupied by the image portion 261' within the panel 205.

In some implementations, the control 220 includes arrows that can be used by the user to replace the zoomed view of the image 250' that shows the image portion 261' depicting a person's face (as illustrated in FIG. 2B) with the zoomed view of the image 250" that shows the succeeding or preceding image portion 264" depicting another person's face (as illustrated in FIG. 2C.) For instance, the system 200 can receive a user input via an arrow of the control 220 to replace the zoomed view of the image 250' that shows the image portion 261' depicting the person's face at the zoom-level larger than the particular level, with a zoomed view of the image 250" that shows the image portion 264" depicting the other person's face at another zoom-level larger than the particular zoom-level. The other larger zoom-level corresponding to the zoomed view 250" is determined by the system 200 to maximize a fraction occupied by the image portion 264" within the panel 205.

In some implementations, although the zoom-levels corresponding to the zoomed views (illustrated in FIGS. 2B-2C) are larger than the particular zoom-level corresponding to the view of the image 250 (illustrated in FIG. 2A), the former zoom-levels are selected to be less than or equal to a predetermined zoom-level. For example the predetermined zoom-level can be 90%, 95% or 100%.

Zoomed views associated with the persons depicted in the image 250 can be displayed in panel 205 in sequential order based on a display index/order. For example, a zoomed view of the image 250' centered on a person's face can be displayed by the system 200 in response to receiving user input via the control 220 to zoom onto a face depicted in the image 250. Another zoomed view of the image 250" can be displayed upon receiving user input to zoom onto the next person's face, and so on, to sequentially display zoomed views of the image which are centered on first, second, third and fourth person's faces, respectively.

In some implementations, the display index can correspond to a face detection index. Assume, for example, that the faces depicted in the image 250 were detected in order from left-to-right. Hence, the first zoomed view can be centered on the image portion 261 which depicts the face in the image 250 that was detected first. Further, the second zoomed view can be centered on the image portion 262 which depicts the face in the image 250 that was detected second. And so on. In other implementations, the display index can be different from the detection index. For instance, the display index used to present, in the panel 205, the zoomed views corresponding to the persons depicted in the image 250 can be based on a size of the depicted face, such that a zoomed view corresponding to the largest detected face is presented first, a zoomed view corresponding to the second largest face is presented second, and so on, with the zoomed view corresponding to the smallest detected face being presented last. Additionally, the system 200 can identify persons associated with the detected faces. Hence, the display index used to present, in the panel 205, the zoomed views corresponding to the persons depicted in the image 250 can be based on various attributes associated with the identified persons, e.g., persons' names, popularities (in terms of number of appearances in a current project/event, library, etc.), family members displayed first followed by others, and the like. For example, the system 200 can present the first zoomed view 250' centered on the image portion 261' which depicts Claire's face, the second zoomed view 250" centered on the image portion 264" which depicts Ellie's face, and so on, in alphabetical order, by first name.

The zoomed views of the image 250 described above in connection with FIGS. 2B and 2C can be used by a user associated with system 200 to assess, on an individual basis, a quality of each of the detected faces corresponding to the image portions 261, 262, 263 and 264.

Figure 3A:
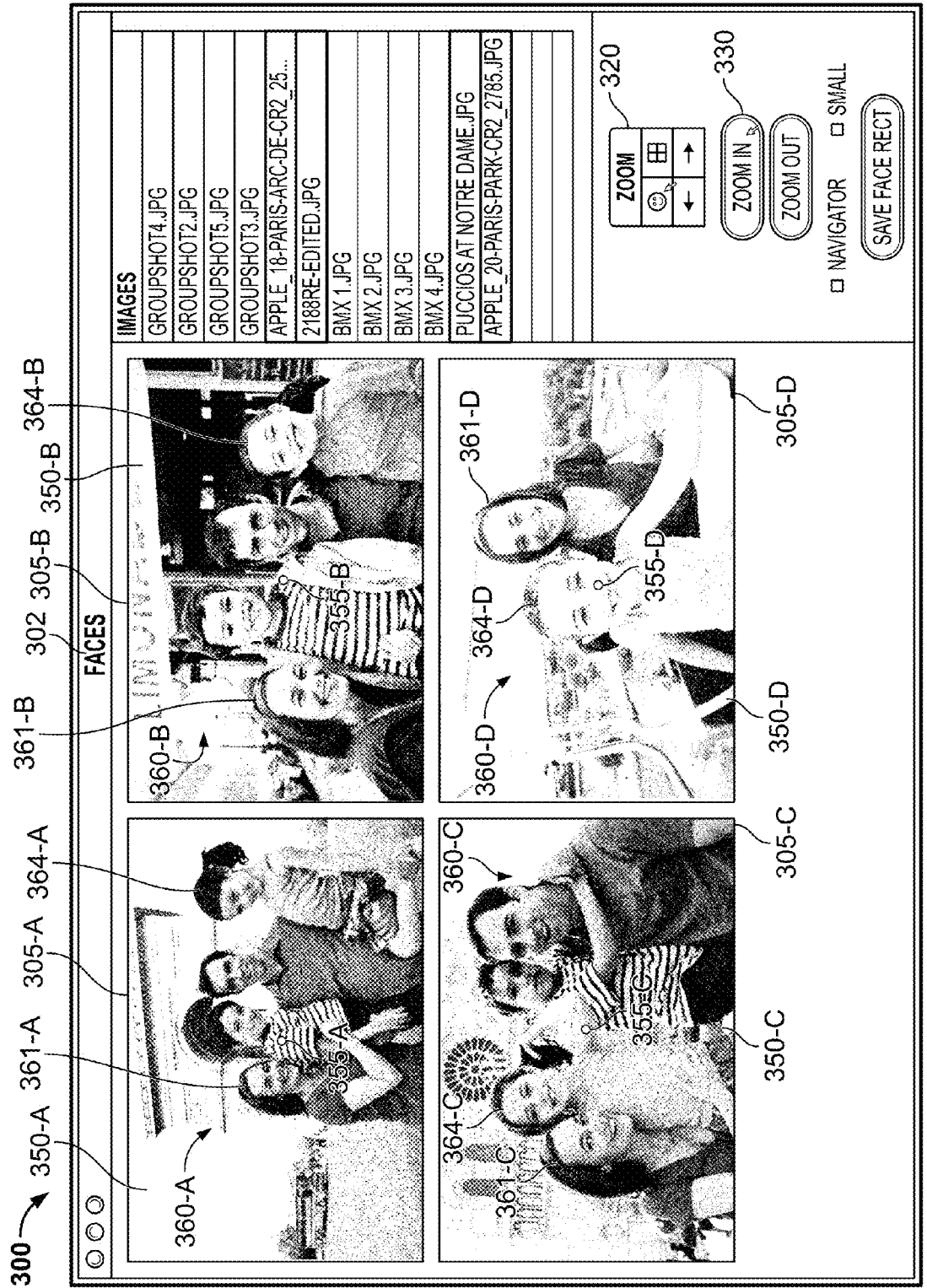
FIGS. 3A-3C show aspects of a system that zooms into portions of images corresponding to faces detected in multiple images.
Figure 3B:
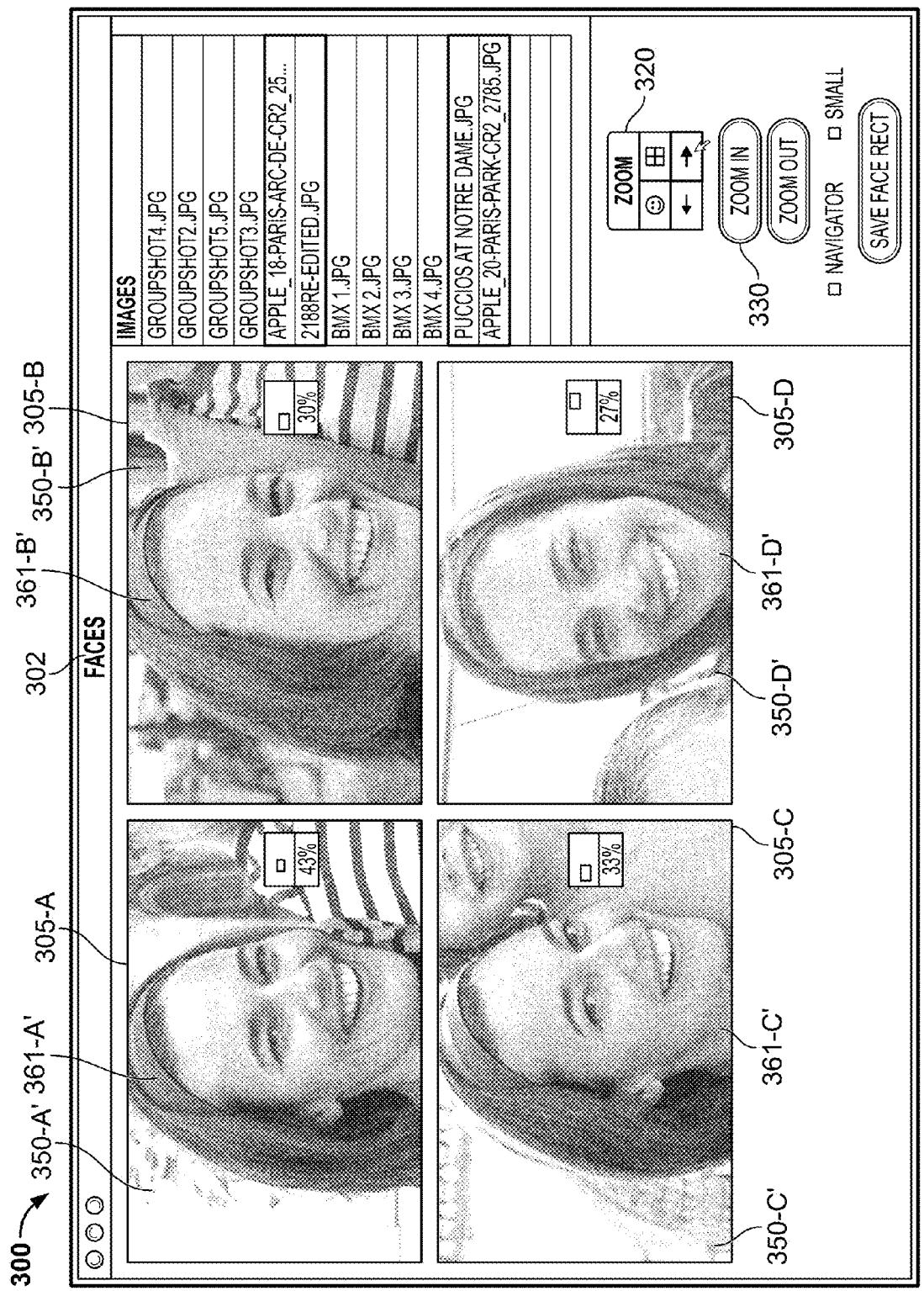
Figure 3C:
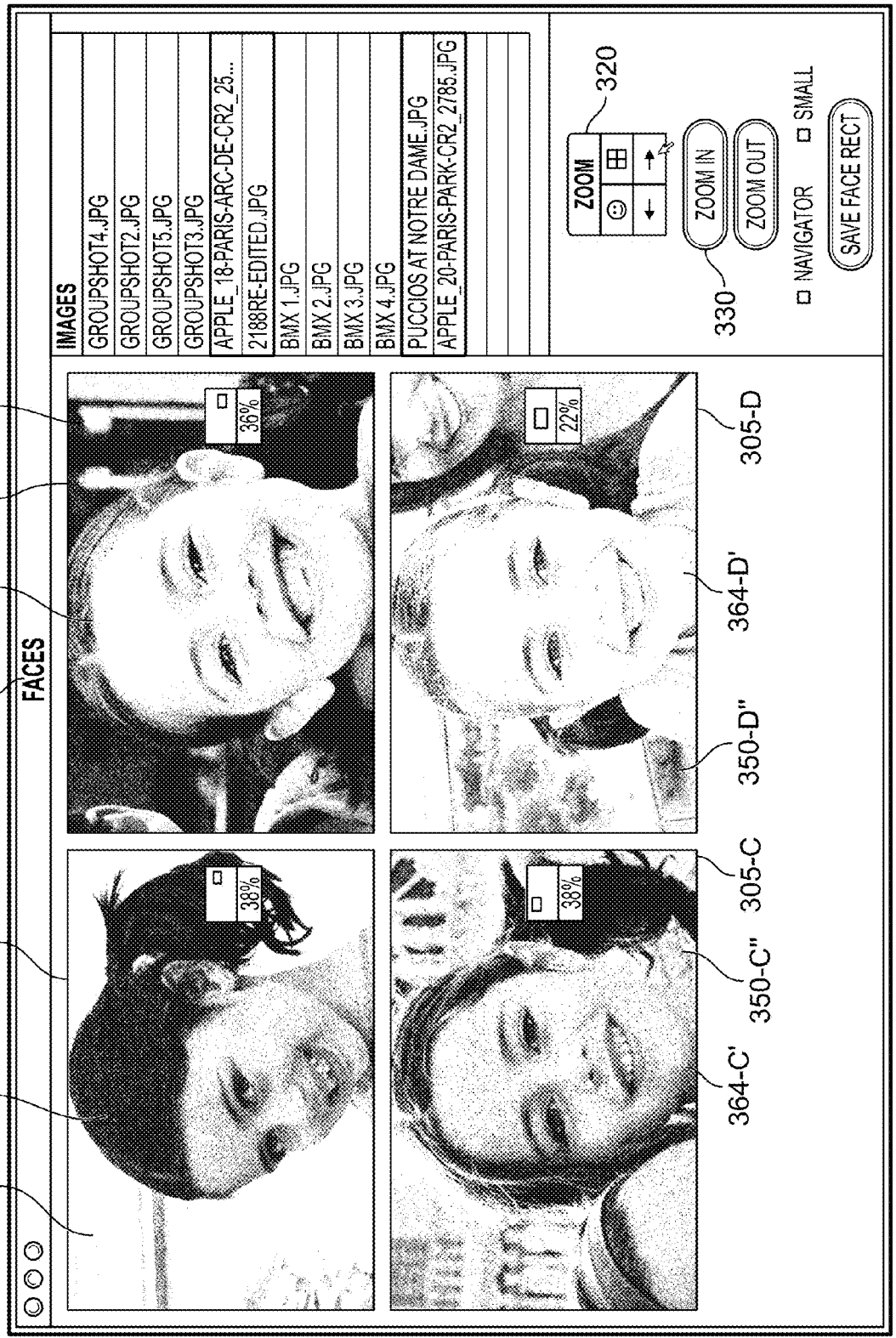

FIGS. 3A-3C show aspects of a system 300 that zooms into portions of images corresponding to faces detected in multiple images 350-A, 350-B, 350-C and 350-D. The system 300 can be implemented, for example, as part of an image processing application. As another example, the system 300 can correspond to the system 100 described above in connection with FIG. 1A for the case when the specified feature of an image portion is that the image portion depicts a human face or an animal face. As yet another example, the system 300 can be an extension of system 200 described above in connection with FIGS. 2A-2C or a combination of multiple instances of the system 200.

The system 300 can include a graphical user interface (GUI) 302. The GUI 302 can present to a user associated with the system 300 multiple panels 305-A, 305-B, 305-C and 305-D used to concurrently display the images 350-A, 350-B, 350-C and 350-D, respectively. Each of these images depicts an associated set of faces. Instances of at least some of the faces depicted in one of the images 305-A, 305-B, 305-C and 305-D may be depicted in other of these images. In some cases, the images 350-A, 350-B, 350-C and 350-D have been captured sequentially.

The GUI 302 can include a control 330 to enable the user to concurrently zoom to the centers 355-A, 355-B, 355-C, 355-D of the respective images 350-A, 350-B, 350-C, 350-D. Note that in FIG. 3A, zooming the multiple images, at high zoom-level, to the image centers may expose image content that may only have marginal viewing value (in this case a person's shoulder, another person's armpit, and the like.) In some implementations, the GUI 302 can enable a user to specify locations of the images 350-A, 350-B, 350-C and 350-D displayed in the respective panels 305-A, 305-B, 305-C and 305-D, by using a cursor or a touch gesture, to prompt the system 300 to zoom into portions of the images centered on the specified image locations entered by the user.

Once again, it would be desirable to present zoomed views of multiple human faces depicted in the images 350-A, 350-B, 350-C and 350-D to allow a user associated with the system 300 to determine one or more faces from among the multiple faces are in focus or otherwise desirable and the image(s) from among the images 350-A, 350-B, 350-C and 350-D corresponding to the determined faces. To this effect, the GUI 302 can also include a control 320 through which the user can request that the system 300 concurrently zooms to portions of the multiple images 350-A, 350-B, 350-C and 350-D depicting faces of several persons.

In response to receiving the request, the system 300 can detect the associated set of faces depicted in each of the images 350-A, 350-B, 350-C and 350-D. Alternatively, in response to receiving the user request, the system 300 can obtain the associated set of faces depicted in each of the images 350-A, 350-B, 350-C and 350-D that were detected prior to concurrently displaying the images 350-A, 350-B, 350-C and 350-D in the respective panels 305-A, 305-B, 305-C and 305-D. In such instances, the system 300 can access and retrieve the previously generated sets of faces without having to detect them on the fly. The system 300 can then concurrently present zoomed views of the image that show respective image portions corresponding to the associated set of faces depicted in the image.

In the example illustrated in FIG. 3A, a view of the image 350-A presented in the panel 305-A shows a first instance of a first person's face depicted in an image portion 361-A and a first instance of a second person's face depicted in an image portion 364-A along with first instances of other persons' faces. Further, a view of the image 350-B presented in the panel 305-B shows a second instance of the first person's face depicted in an image portion 361-B and a second instance of the second person's face depicted in an image portion 364-B along with second instances of the other persons' faces. Note that the first and second persons' faces are depicted first and last, respectively in left-to-right order, among the detected faces in the images 350-A and 350-B. Furthermore, a view of the image 350-C presented in the panel 305-C shows a third instance of the first person's face depicted in an image portion 361-C and a third instance of the second person's face depicted in an image portion 364-C along with third instances of the other persons' faces. Note that the first and second persons' faces are depicted first and second, respectively in left-to-right order, among the detected faces in the image 350-C. Also, a view of the image 350-D presented in the panel 305-D shows a fourth instance of the first person's face depicted in an image portion 361-D and a fourth instance of the second person's face depicted in an image portion 364-D, without depicting any other faces. Note that the first and second persons' faces are depicted second and first, respectively in left-to-right order, in the image 350-C. The system 300 presents the views of the images 350-A, 350-B, 350-C and 350-D in the panels 305-A, 305-B, 305-C and 305-D at respective initial zoom-levels, such that each of the initial zoom-levels is determined by a ratio of the size of the panel to the size of image.

The system 300 can obtain the sets of previously or on the fly detected image portions 360-A, 360-B, 360-C, 360-D that depict faces in the views of the images 350-A, 350-B, 350-C, 350-D and can identify the depicted faces. The system 300 can then replace the views of the images 350-A, 350-B, 350-C and 350-D concurrently presented in the panels 305-A, 305-B, 305-C and 305-D at the respective initial zoom-levels with zoomed views of the images 350-A', 350-B', 350-C' and 350-D' that show first, second, third and fourth instances of the first person's face depicted in the image portions 361-A', 361-B', 361-C' and 361-D' concurrently presented in the panels 305-A, 305-B, 305-C and 305-D at respective zoom-levels that are larger than the respective initial zoom-levels, as illustrated in FIG. 3B. The larger respective zoom-levels corresponding to the zoomed views of the images 350-A', 350-B', 350-C' and 350-D' are determined by the system 300 to maximize respective fractions occupied by the image portions 361-A', 361-B', 361-C' and 361-D' within the panels 305-A, 305-B, 305-C and 305-D.

In some implementations, the control 320 includes (right and left) arrows that can be used by the user to instruct the system 300 to replace the zoomed views of the images 350-A', 350-B', 350-C' and 350-D' that concurrently show the image portions 361-A', 361-B', 361-C' and 361-D' depicting first, second, third and fourth instances of the first person's face at the zoom-levels larger than the respective initial zoom-levels (as illustrated in FIG. 3B) with zoomed views of the images 350-A", 350-B", 350-C" and 350-D" that concurrently show the respective succeeding or respective preceding image portions 364-A", 364-B", 364-C" and 364-D" depicting first, second, third and fourth instances of the second person's face at other zoom-levels larger than the respective initial zoom-levels (as illustrated in FIG. 3C.) The other larger zoom-levels corresponding to the zoomed views 350-A", 350-B", 350-C" and 350-D" are determined by the system 300 to maximize respective fractions occupied by the image portion 364-A", 364-B", 364-C" and 364-D" within the panels 305-A, 305-B, 305-C and 305-D.

In some implementations, although the zoom-levels corresponding to the zoomed views (illustrated in FIGS. 2B-2C) are larger than the initial zoom-levels corresponding to the view of the images 350-A, 350-B, 350-C, 350-D (illustrated in FIG. 3A), the zoom-levels corresponding to the zoomed views are selected to be less than or equal to a predetermined zoom-level. For example the predetermined zoom-level can be 90%, 95% or 100%.

Upon receiving user input via the arrows of the control 320, the system 300 can switch, based on a display index/order associated with an anchor image, from concurrently presenting zoomed views associated with the detected instances of a person's face to concurrently presenting zoomed views associated with the detected instances of another person's face. For example, the anchor image may be the image 350-A displayed in the first panel 305-A. Determining an order of displaying the zoomed views associated with persons depicted in the anchor image 350-A in the panel 305-A, or equivalently determining the display index corresponding to the panel 305-A associated with the anchor image 350-A, can be performed as described above in connection with FIG. 2B.

In general, the system 300 can select the anchor image from among the displayed images 350-A, 350-B, 350-C and 350-D based at least on one of the criteria enumerated below. In some implementations, the anchor image represents an image from among the displayed images 350-A, 350-B, 350-C and 350-D that has the largest quantity of detected faces. In other implementations, the anchor image has the largest quantity of detected faces from a specified group, e.g. a family, a scout-den, classroom, and the like. In some other implementations, the anchor image has the largest quantity of popular faces. The latter represent faces that appear in an image library, project, event, and the like, with frequencies that exceed a threshold frequency. In yet other implementations, the anchor image has the largest quantity of faces which are detected in the largest quantity of images from among the displayed images 350-A, 350-B, 350-C and 350-D.

In case a person is missing from a particular image from among the images 350-B, 350-C and 350-D that are different from the anchor image 350-A, e.g., a person identified in the anchor image 350-A is not identified among the detected faces associated with the particular image, the system 300 can handle this situation in multiple ways. In some implementations, the zoomed view of the particular image corresponding to the previously shown person can be displayed concurrently with zoomed views of the other images corresponding to the person that is missing from the particular image. In other implementations, the (zoom-out) view of the particular image at the initial zoom-level can be displayed concurrently with the zoomed views of the other images corresponding to the person that is missing from the particular image. In some other implementations, the panel associated with the particular image can be filled with a blank background and can be displayed concurrently with the zoomed views of the other images corresponding to the person that is missing from the particular image. In the latter implementations, the panel associated with the particular image may have in the foreground a face icon, or another face representation. Alternatively, the panel associated with the particular image may include a text label, e.g., a name of the missing person, a symbol, e.g., "?", "!", and the like.

In case there is an extra person in a particular image from among the images 350-B, 350-C and 350-D that are different from the anchor image 350-A, e.g., a person identified among the detected faces associated with the particular image is not identified in the anchor image 350-A, the system 300 can handle this situation in multiple ways. In some implementations, a zoomed view of the particular image corresponding to the extra person can be displayed concurrently with the zoomed views of the other images corresponding to the previously shown person. In other implementations, a zoomed view of the particular image corresponding to the extra person can be displayed concurrently with the (zoom-out) views of the other images at the respective initial zoom-levels. In some other implementations, a zoomed view of the particular image corresponding to the extra person can be displayed concurrently with blank backgrounds shown in the panels associated with the other images. Alternatively, the panels associated with the other images include a text label, e.g., a name of the missing person, a symbol, e.g., "?", "!", and the like.

Moreover, the zoomed view of the particular image corresponding to the extra detected person can be presented as the last zoomed view in the display order, e.g., after zoomed views corresponding to all faces that were detected in the anchor image have been presented. Alternatively, the zoomed view of the particular image corresponding to the extra detected person can be inserted in the display order based on a rule that was used to determine the display order of the anchor image 350-A. For example, if the order of presenting the zoomed views corresponding to persons depicted in the anchor image 350-A in the panel 305-A is alphabetical, then the zoomed view of the particular image corresponding to the extra detected person is inserted into the display order based on the name of the extra detected person.

Figure 4A:
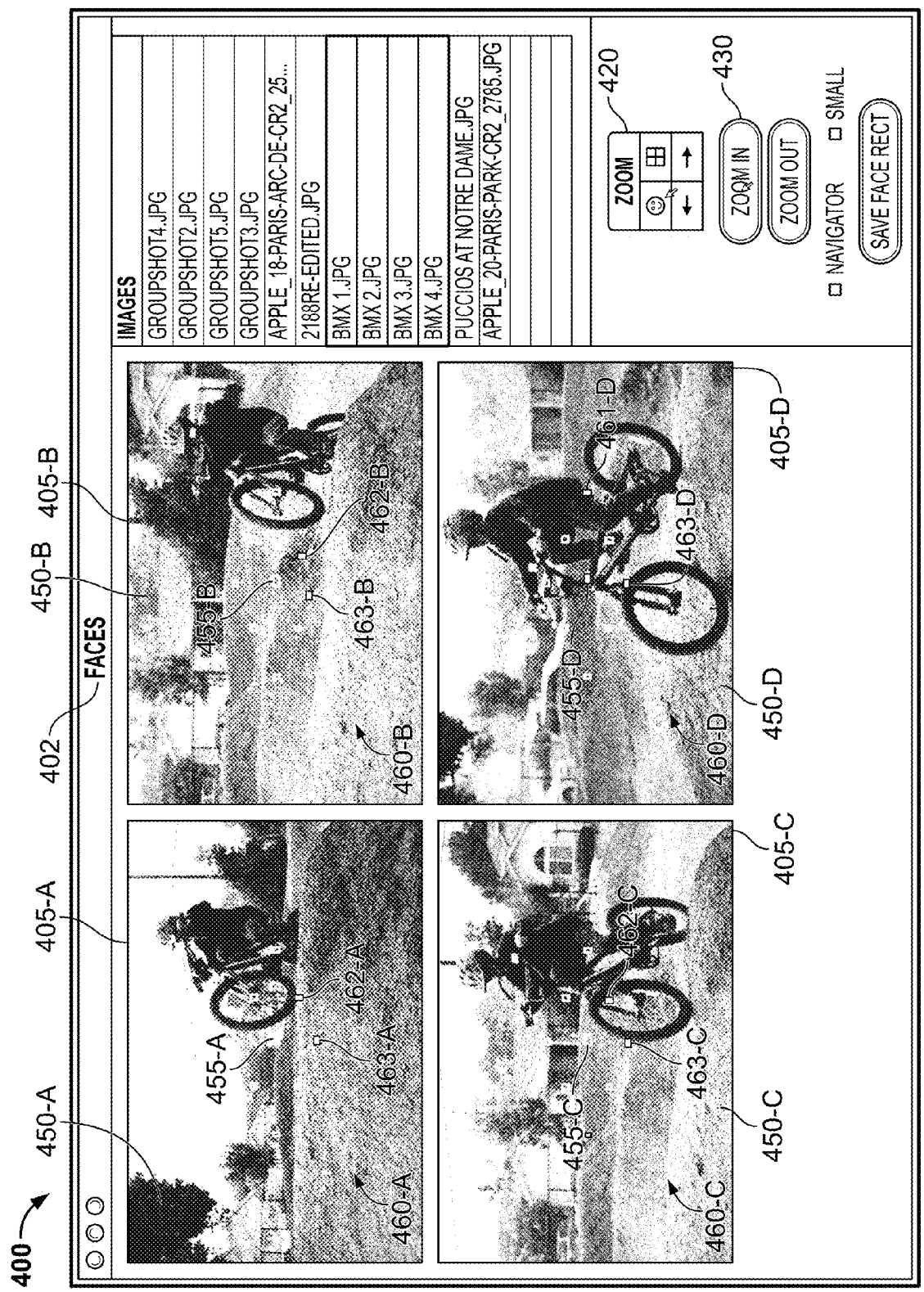
FIGS. 4A-4C show aspects of a system that zooms into portions of images corresponding to focus locations of one or more images.
Figure 4B:
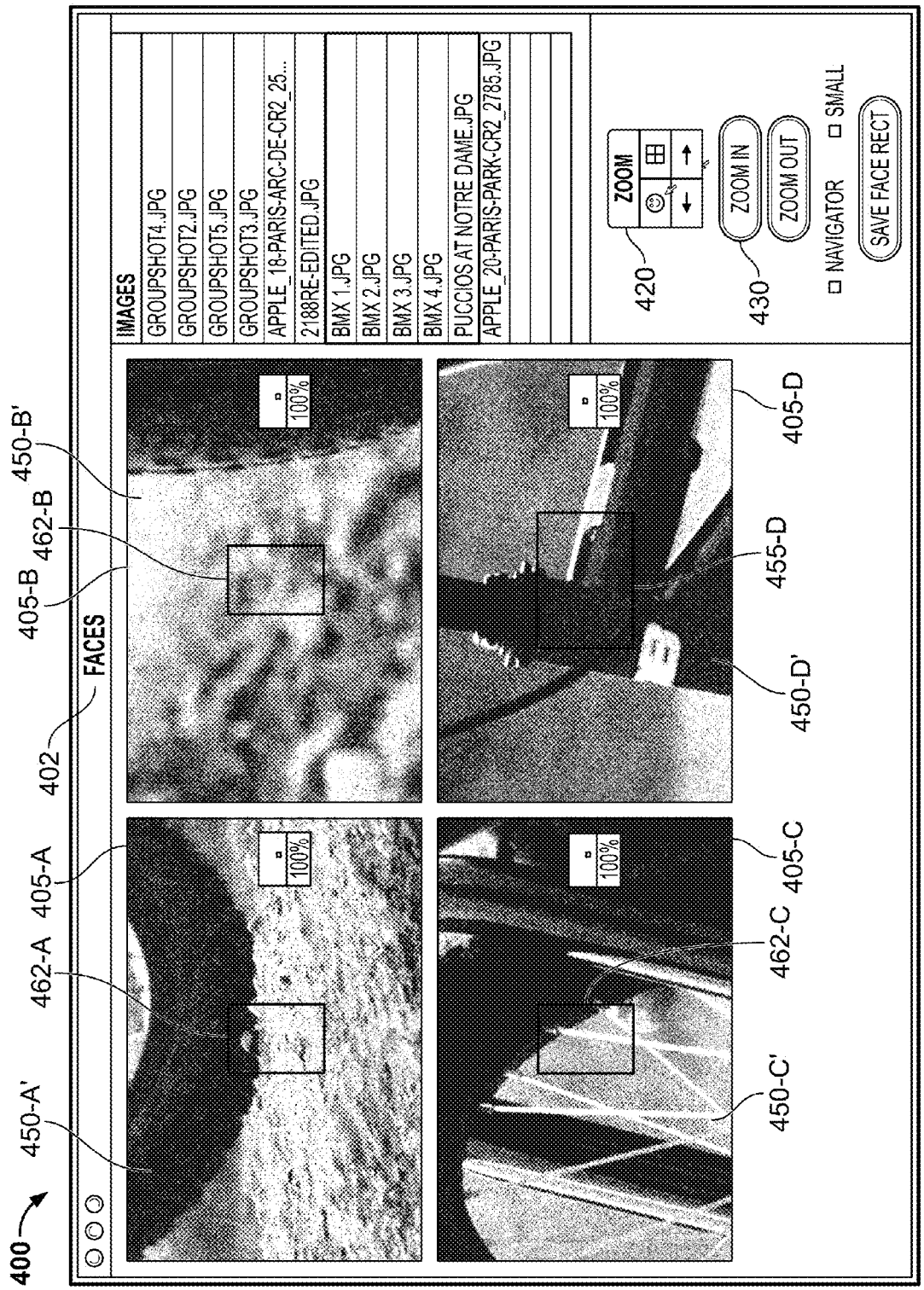
Figure 4C:
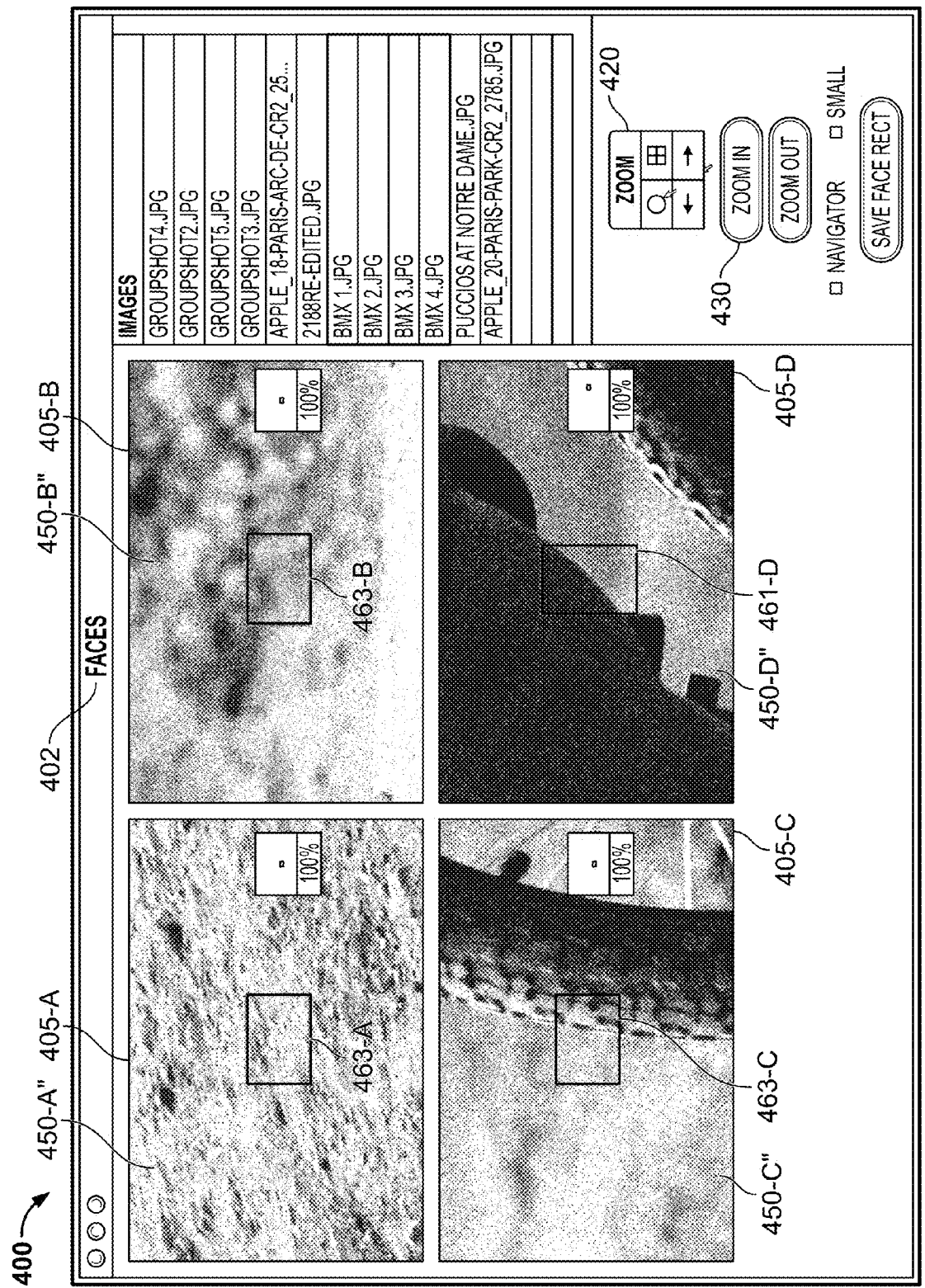

FIGS. 4A-4C show aspects of a system that zooms into portions of images corresponding to focus locations of one or more images. The system 400 can be implemented, for example, as part of an image processing application. As another example, the system 400 can correspond to the system 100 described above in connection with FIG. 1A for the case when the specified feature of an image portion is that the image portion includes a focus location.

The system 400 can include a graphical user interface (GUI) 402. The GUI 402 can present to a user associated with the system 400 one (e.g., 405-A) or more (e.g., 405-B, 405-C and 405-D) panels used to (concurrently) display the image(s) 450-A (and 450-B, 450-C, 450-D, respectively.) Each of these images includes an associated set of focus locations. For example, the set 460-A of focus locations associated with the image 450-A includes focus location 462-A and another focus location 463-A.

In the example implementations described in connection with FIGS. 4A-4C, the focus locations associated with an image have been used by a camera for acquiring the image. The focus locations can be represented by red (dark) rectangles. Moreover, the focus locations have been automatically selected by the camera from among a constellation of N predetermined locations. For the particular camera that acquired the images 450-A, 450-B, 450-C and 450-D, there are N=9 locations in the constellation, and the constellation locations that were not selected as a focus location can be represented by white (light) rectangles. The constellation locations and the focus locations are stored in memory along with metadata associated with an image.

The GUI 402 can include a control 430 to enable the user to concurrently zoom to the centers 455-A, 455-B, 455-C, 455-D of the respective images 450-A, 450-B, 450-C, 450-D. Note that in FIG. 4A, zooming the multiple images at high zoom-level to the image centers exposes image content that may only have marginal viewing value (in this case mostly dirt.) In some implementations, the GUI 402 can enable a user to specify locations of the images 450-A, 450-B, 450-C and 450-D displayed in the respective panels 405-A, 405-B, 405-C and 405-D, by using a cursor or a touch gesture, to prompt the system 400 to zoom into portions of the images centered on the specified image locations entered by the user.

It would be desirable to present automatically generated zoomed views of one or more focus locations included in the images 450-A, 450-B, 450-C and 450-D to allow a user associated with the system 400 to examine whether content at and near one or more focus locations is in focus or otherwise desirable. To this effect, the GUI 402 can also include a control 420 through which the user can request that the system 400 concurrently zooms to focus locations of the one 450-A or more 450-B, 450-C and 450-D images. In response to receiving the request, the system 400 retrieves the associated set of focus locations from metadata corresponding to the images 450-A, 450-B, 450-C and 450-D, and concurrently presents zoomed views of the image that show respective focus locations.

In the example illustrated in FIG. 4A, a view of the image 450-A presented in the panel 405-A shows a set 460-A of focus locations including a first focus location 462-A corresponding to a second constellation point and a second focus location 463-A corresponding to a third constellation point. Further, a view of the image 450-B presented in the panel 405-B shows a set 460-B of focus locations including a first focus location 462-B corresponding to a second constellation point and a second focus location 463-B corresponding to a third constellation point. Furthermore, a view of the image 450-C presented in the panel 405-C shows a set 460-C of focus locations including a first focus location 462-C corresponding to a second constellation point and a second location point 463-C corresponding to a third constellation point. Also, a view of the image 450-D presented in the panel 405-D shows a set 460-D of focus locations including a first focus location 455-D corresponding to a zeroth constellation point, a second focus location 461-C corresponding to a first constellation point, and a third focus location 463-C corresponding to a third constellation point.

The system 400 presents the views of the images 450-A, 450-B, 450-C and 450-D in the panels 405-A, 405-B, 405-C and 405-D at respective initial zoom-levels, such that each of the initial zoom-levels is determined by a ratio of the size of the panel to the size of image.

Upon receipt of a user input via the control 420, the system 400 can access the sets of focus locations 460-A, 460-B, 460-C, 460-D in the views of the images 450-A, 450-B, 450-C, 450-D. The system 400 can then concurrently replace the views of the images 450-A, 450-B, 450-C and 450-D presented in the panels 405-A, 405-B, 405-C and 405-D at the respective initial zoom-levels with zoomed views of the images 450-A', 450-B', 450-C' and 450-D' showing first 462-A, second 462-B, third 462-C and fourth 455-D instances of the first focus location at a predetermined zoom-level that is larger than the initial zoom-levels, as illustrated in FIG. 4B. For example the predetermined zoom-level can be 90%, 95% or 100%.

In some implementations, the control 420 includes (right and left) arrows that can be used by the user to instruct the system 400 to concurrently replace the zoomed views of the images 450-A', 450-B', 450-C' and 450-D' that show the first 462-A, second 462-B, third 462-C and fourth 455-D instances of the first focus location at the predetermined zoom-level larger than the respective initial zoom-levels (as illustrated in FIG. 4B) with zoomed views of the images 450-A", 450-B", 450-C" and 450-D" that show the respective first 463-A, second 463-B, third 463-C and fourth 461-D instances of the succeeding or preceding focus location (in the case illustrated in FIG. 4C the second focus location) at the predetermined zoom-level larger than the respective initial zoom-levels.

Upon receiving user input via the arrows of the control 420, the system 400 can switch from concurrently presenting zoomed views showing instances of the $i^{th}$ focus location to concurrently presenting zoomed views showing instances of the $j^{th}$ focus location based on a display index/order associated with an anchor image. For example, the anchor image 450-A may be displayed in the first panel 405-A. An order of displaying the zoomed views showing focus locations of the anchor image 350-A in the panel 305-A, or equivalently a display index corresponding to the panel 305-A associated with the anchor image 350-A, can be based on the order of points within the constellation, 0, 1, . . . , N. As another example, the display index corresponding to the panel 305-A associated with the anchor image 350-A can be user specified (e.g., the user can supply a preferred/desired order for traversing the constellation points.)

In general, the system 400 can select the anchor image from among the displayed images 450-A, 450-B, 450-C and 450-D based at least on one of the criteria enumerated below. In some implementations, the anchor image represents an image from among the displayed images 450-A, 450-B, 450-C and 450-D that has the largest quantity of focus locations (e.g., the image 450-D has 3 focus locations, while the other images 450-A, 450-B, 450-C have 2 focus locations.) In other implementations, the anchor image must have one of the focus locations at the center of the anchor image.

In case a particular image from among the images 450-B, 450-C and 450-D has fewer focus locations than the anchor image 450-A, the system 400 can handle this situation in multiple ways. In some implementations, the zoomed view of the particular image corresponding to the previously shown focus location can be displayed concurrently with zoomed views of the other images corresponding to the focus location that is missing from the particular image. In other implementations, the (zoom-out) view of the particular image at the initial zoom-level can be displayed concurrently with the zoomed views of the other images corresponding to the focus location that is missing from the particular image. In some other implementations, the panel associated with the particular image can be filled with a blank background and can be displayed concurrently with the zoomed views of the other images corresponding to the focus location that is missing from the particular image. In the latter implementations, the panel associated with the particular image may have in the foreground information related to the missing focus location, e.g., "constellation point k was not selected as a focus location", "region k is potentially out-of-focus", and the like.

In case there is an extra focus location in a particular image from among the images 450-B, 450-C and 450-D that are different from the anchor image 450-A, the system 400 can handle this situation in multiple ways. In some implementations, a zoomed view of the particular image corresponding to the extra focus location can be displayed concurrently with the zoomed views of the other images corresponding to the previously shown focus point. In other implementations, a zoomed view of the particular image corresponding to the extra focus location can be displayed concurrently with the (zoom-out) views of the other images at the respective initial zoom-levels. In some other implementations, a zoomed view of the particular image corresponding to the extra focus location can be displayed concurrently with blank backgrounds shown in the panels associated with the other images. In the latter implementations, the panels associated with the other images may have in the foreground information related to the extra focus location, e.g., "constellation point k was selected as focus location", "region k is potentially in-focus", and the like.

Moreover, the zoomed view of the particular image corresponding to the extra focus location can be presented as the last zoomed view in the display order, e.g., after zoomed views corresponding to all focus locations in the anchor image have been presented. Alternatively, the view of the particular image corresponding to the extra focus point can be inserted in the display order based on a rule that was used to determine the display order of the anchor image 450-A. For example, if the order of presenting the zoomed views showing focus locations in the anchor image 450-A in the panel 405-A correspond to the index of the constellation, then the view of the particular image corresponding to the extra focus location is inserted into the display order based on the constellation index of the extra focus location.

Figure 5:
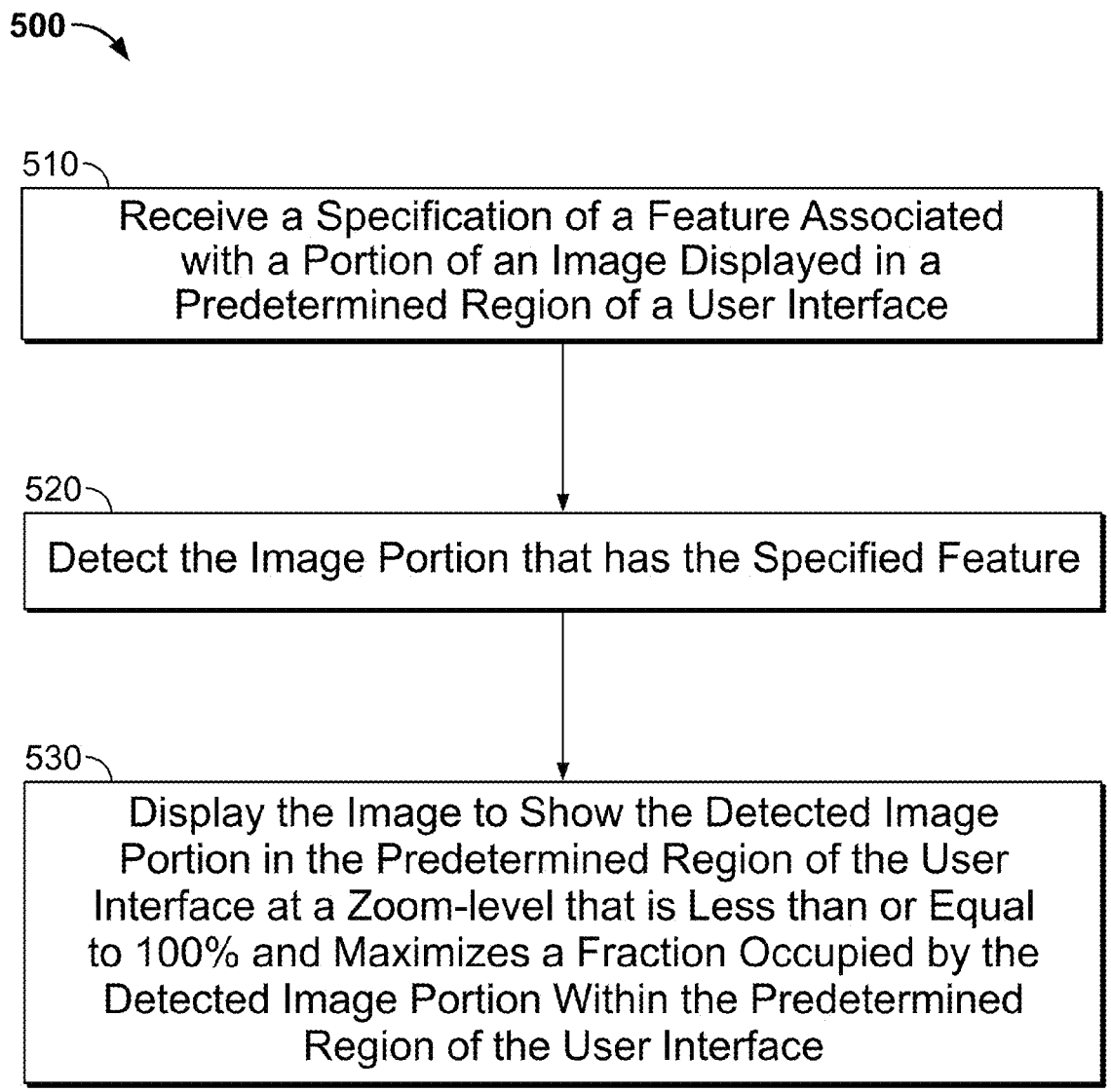
FIG. 5 shows an example of a method for zooming into an image portion that has a specified feature.

FIG. 5 shows an example of a method for zooming into an image portion that has a specified feature. In some implementations, the process 500 can be executed by one or more computers, for example in conjunction with system 100 to generate zoomed views of an image that show image portions having a specified feature. For instance, the process 500 can be applied to an image displayed in a predetermined region of the user interface of system 100. For example, the predetermined region of the user interface can be an image panel, and the image can be displayed at an initial zoom-level determined by a relative size of the image with respect to the panel. In another instance, a subset of the process 500 can be applied to the image displayed in the predetermined region of the user interface of the system 100.

At 510, a user specification of a feature associated with a portion of the image is received. In some implementations, the user can specify that the image portion depicts an object. For example, the object can be a human face depicted in the image (e.g., as described in connection with FIGS. 2A-2C and 3A-3C) or an animal face depicted in the image. In another example, the object can be one of a vehicle, a building, and the like, that is depicted in the image. In other implementations, the user can specify that the image portion is in focus. For example, the image portion is considered to be in focus if it includes a focus location as recorded in metadata corresponding to the camera that acquired the image (e.g., as described in connection with FIGS. 4A-4C.) As another example, the image portion can be considered in focus if edges depicted in the image portion meet a certain level of sharpness. In some other implementations, the user can specify that the image portion includes a predetermined image location, e.g., that the image portion is centered on a predetermined pixel. For example, the predetermined image location can be an image location to which the user zoomed during a previous viewing of the image. As another example, the predetermined image location can be any one of the centers of quadrants of the image.

At 520, one or more image portions that have the specified feature are determined. In implementations for which the specified feature is that a portion of the image depicts a face, one or more face detectors can be used to determine a portion of the image that bounds a face. Note that none, one or more than one face can be detected in the image, and the corresponding image portions depicting a face are determined as boxes bounding the detected one or more faces. In some instances, detecting the one or more faces in the image can be performed prior to displaying the image in the predetermined region of the user interface of system 100. In such instances, image portions corresponding to previously detected faces can be accessed and retrieved without having to detect them on the fly as part of the process 500. In implementations for which the specified feature is that a portion of the image is in focus, the focus location(s) can be accessed in the metadata stored with the image, for instance. For example, the image portion(s) can be determined as the box(es) having a predetermined or an adaptive size and being centered on the focus location(s). In another example, edge detectors can be used on determine the image portion (s) that is (are) in focus. In implementations for which the specified feature is that a portion of the image includes a predetermined image location, the latter can be accessed in the metadata stored with the image. For example, a pixel to which the image was zoomed last can be obtained (from persistent storage or from volatile memory.) The image portion can be determined in this case as a box centered on the obtained pixel and having a predetermined or an adaptive size, for instance. As another example, pixels corresponding to the centers of the four image quadrants can be calculated. Four image portions can be determined in this manner, each being centered on a center of the four image quadrants and having a predetermined size (e.g., smaller than the size of the image quadrant) or an adaptive size (e.g., which corresponds to a view of the image at a zoom-level of 100%.)

At 530, the image is displayed to show the detected image portion in the predetermined region of the user interface at a zoom-level that (i) is less than or equal to a predetermined zoom-level and (ii) maximizes a fraction occupied by the detected image portion within the predetermined region of the user interface. The predetermined zoom-level can be 90%, 95%, 100% or other predetermined values. For example, in the implementation described above in connection with FIG. 1A, the system 100 can switch from presenting a view of the image at the initial zoom-level, in the predetermined region of the user interface, to displaying a zoomed view of the image at a zoom-level larger than the initial zoom-level but no larger than 100%, in the same predetermined region of the user interface, such that the image portion detected to have the specified feature occupies a maximum fraction of the predetermined region of the user interface. In some implementations, the detected image portion having the specified feature is centered in the zoomed view presented in the predetermined region of the user interface.

Subsequently to presenting the zoomed view at 530, another zoomed view of the image can be presented to show another detected image portion having the specified feature at another zoom-level that is selected (i) to be less than or equal to the predetermined zoom-level and (ii) to maximize the fraction occupied by the other detected image portion having the specified feature within the other view of the image. In some implementations, an order of sequentially presenting multiple zoomed views corresponding to the multiple detected image portions having the specified feature is different from an order in which the multiple image portions were detected.

The process 500 also can be implemented for processing two or images concurrently displayed in respective predetermined regions of the user interface. For example, each of the two or more images can include two or more image portions having the specified feature. Respective zoomed views of the two or more images can be concurrently presented in accordance with 530, such that each of the zoomed views is presented to show the detected instance of the image portion having the specified feature at the zoom-level that was selected (i) to be less than or equal to the predetermined zoom-level and (ii) to maximize the fraction occupied by the detected instance of the image portion having the specified feature within the view of the image. While the foregoing two or more zoomed views are being presented, a user request may be received to concurrently present other zoomed views of the two or more images. Based on 530, the requested other zoomed views of the two or more images can be presented, such that each of the other zoomed views is presented to show the detected instance of another image portion having the specified feature at another zoom-level that was selected (i) to be less than or equal to the predetermined zoom-level and (ii) to maximize the fraction occupied by the detected instance of the other image portion having the specified feature within the other view of the image.

In some implementations, concurrently presenting zoomed views of multiple images corresponding to two or more instances of an image portion having the specified feature is based on the instant of the image portion in a particular image of the multiple images. The particular image can be selected as the image containing a largest quantity of image portions that have the specified feature. Alternatively, the particular image can be user specified.

Figure 6:
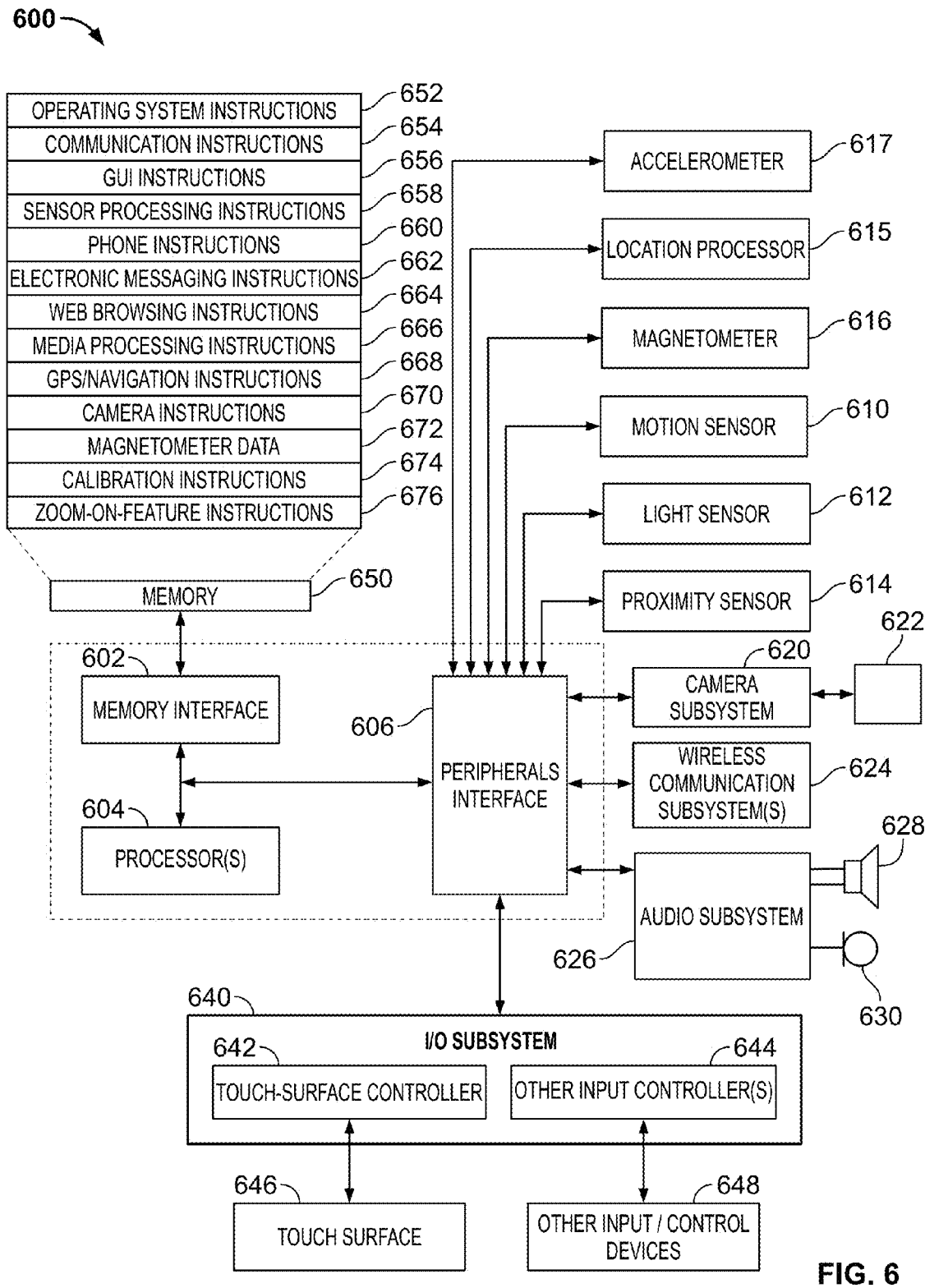
FIG. 6 is a block diagram of an example of a mobile device operated according to the technologies described above in connection with FIGS. 1-5.

FIG. 6 is a block diagram of an example of a mobile device 600 operated according to the technologies described above in connection with FIGS. 1-5. A mobile device can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include one or more application processors (APs) and one or more baseband processors (BPs). The application processors and baseband processors can be integrated in one single process chip. The various components in mobile device 600, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Accelerometer 617 can also be connected to peripherals interface 606 to provide data that can be used to determine change of speed and direction of movement of the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi or WiMax network, and a Bluetooth network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions.

I/O subsystem 640 can include touch surface controller 642 and/or other input controller(s) 644. Touch-surface controller 642 can be coupled to a touch surface 646 (e.g., a touch screen or touch pad). Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In some implementation, a pressing of the button for a first duration may disengage a lock of the touch surface 646; and a pressing of the button for a second duration that is longer than the first duration may turn power to mobile device 600 on or off. The user may be able to customize a functionality of one or more of the buttons. The touch surface 646 can, for example, also be used to implement virtual or soft buttons and/or a keyboard, such as a soft keyboard on a touch-sensitive display.

In some implementations, mobile device 600 can present recorded audio and/or video files, such as MP3, AAC, and MPEG files. In some implementations, mobile device 600 can include the functionality of an MP3 player, such as an iPod™. Mobile device 600 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate Global Navigation Satellite System (GNSS) (e.g., GPS) and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can include tiled zoom instructions 676 that can include zoom-on-feature functions, and other related functions described with respect to FIGS. 1-5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Figure 7:
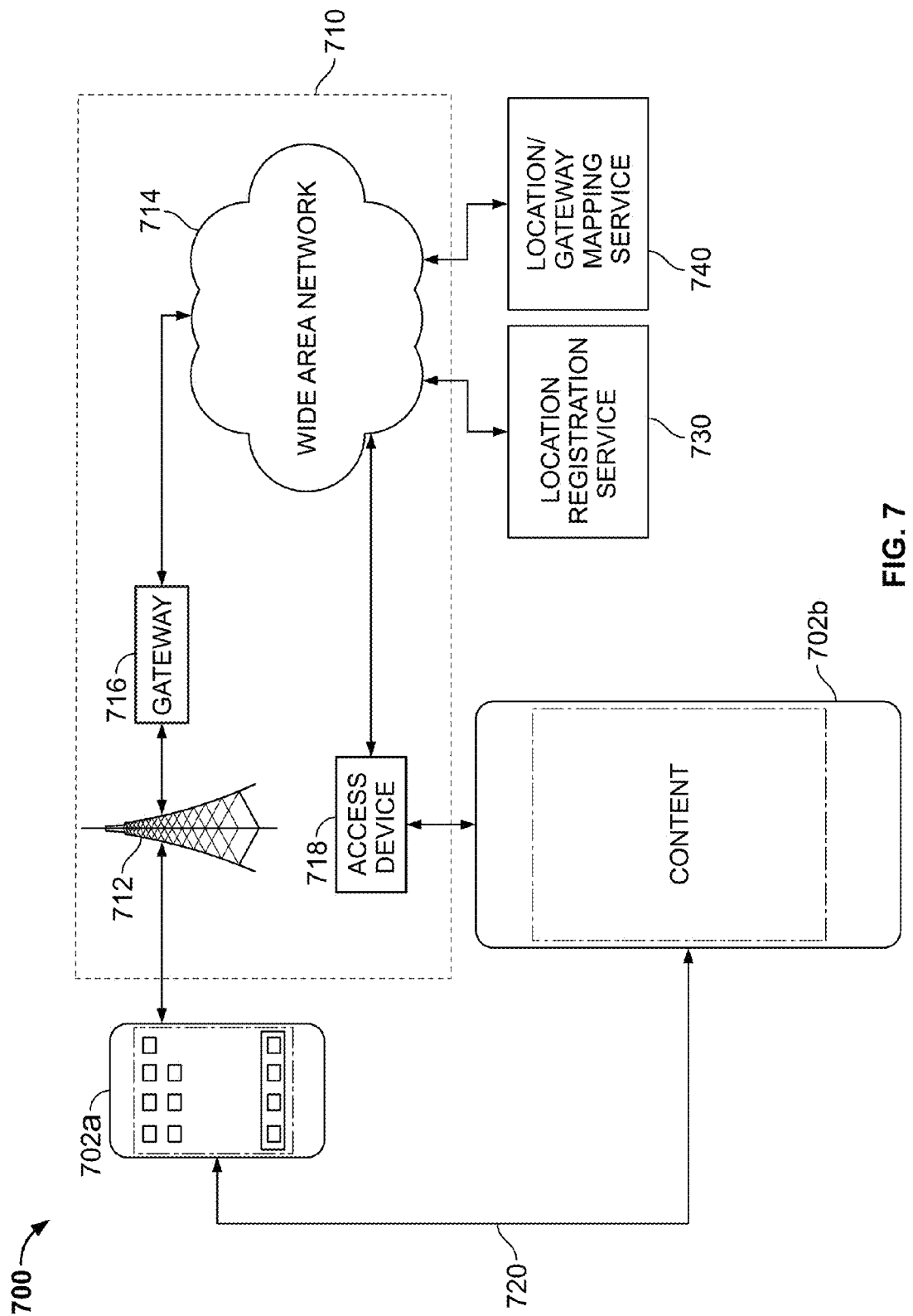
FIG. 7 is a block diagram of an example of a network operating environment for mobile devices operated according to the technologies described above in connection with FIGS. 1-5.

FIG. 7 is a block diagram of an example of a network operating environment 700 for mobile devices operated according to the technologies described above in connection with FIGS. 1-4. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access device, can provide communication access to the wide area network 714.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices 702a or 702b, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730 and 740 over the one or more wired and/or wireless networks. For example, one or more location registration services 730 can be used to associate application programs with geographic regions. The application programs that have been associated with one or more geographic regions can be provided for download to mobile devices 702a and 702b.

Location gateway mapping service 740 can determine one or more identifiers of wireless access gateways associated with a particular geographic region, and provide the one or more identifiers to mobile devices 702a and 702b for registration in association with a baseband subsystem.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processes executing on a computer system, the method comprising:
   presenting, on a user interface viewable on a display coupled to the computer system, one or more digital images;
   receiving user input requesting to zoom to faces depicted in the one or more digital images, where the faces include either human faces or animal faces; and
   in response to receiving the user input and for each of the one or more digital images, automatically presenting on the user interface a zoomed view of the digital image that displays an enlarged representation of a portion of the digital image showing an instance of a face depicted in the displayed portion of the digital image, the zoomed view of the digital image covering an area of the user interface configured to present the one or more digital images, the zoomed view being presented at a zoom-level that is selected to maximize a fraction of the displayed portion of the digital image occupied by the face, the zoomed view displaying a scaled representation of the portion of the digital image without generating a derivative image or altering the digital image.

2. The method of claim 1, where the selected zoom-level is less than or equal to a predetermined zoom-level that is set at 100%.

3. The method of claim 1, where the instance of the face is centered in the zoomed view of the digital image.

4. The method of claim 1, comprising:
   in response to receiving the user input, for each of the one or more digital images:
      examining the digital image; and
      upon examining the digital image, detecting an instance of at least one face depicted in the digital image.

5. The method of claim 1, comprising:
   for each of the one or more digital images, detecting an instance of at least one face depicted in the digital image prior to receiving the user request.

6. The method of claim 1, where, for each of the one or more digital images, the zoomed view of the digital image is displayed in a predetermined region of the user interface.

7. A method performed by one or more processes executing on a computer system, the method comprising:
   presenting, on a user interface viewable on a display coupled to the computer system, a digital image that depicts a first face and a second face;
   receiving a first user input;
   in response to receiving the first user input, automatically presenting on the user interface a first zoomed view of the digital image that displays an enlarged representation of a first portion of the digital image including an instance of the first face, the first zoomed view presented at a zoom-level that is selected to maximize a fraction of the displayed first portion of the digital image occupied by the first face, the first zoomed view displaying a scaled representation of the first portion of the digital image without generating a derivative image or altering the digital image;
   receiving a second user input; and
   in response to receiving the second user input, switching from the first zoomed view to automatically presenting on the user interface a second zoomed view of the digital image that displays an enlarged representation of a second portion of the digital image including an instance of the second face, the second zoomed view presented at a different zoom-level that is selected to maximize the fraction of the displayed second portion of the digital image occupied by the second face, the second zoomed view displaying a scaled representation of the second portion of the digital image without generating a derivative image or altering the digital image.

8. The method of claim 7, where the first zoomed view and the second zoomed view are presented in a sequential order, and where the sequential order is different from a detection order of the first face and the second face.

9. The method of claim 8, where the sequential order is based on identity of persons associated with the first face and the second face.

10. The method of claim 8, where the sequential order is based on sizes of the first face and the second face.

11. A method performed by one or more processes executing on a computer system, the method comprising:
   presenting, on a user interface viewable on a display coupled to the computer system, two or more digital images that are captured independent of one another, each of the two or more digital images depicts a first face and a second face, wherein zoomed views of the two or more digital images are presented concurrently;
   receiving a first user input;
   in response to receiving the first user input, automatically presenting, on the user interface, concurrent zoomed views of the two or more digital images, such that each of the concurrent zoomed views is presented to display enlarged representation of a first portion of the respective digital image that includes an instance of the first face, each of the concurrent zoomed views presented at a zoom-level that is selected to maximize a fraction of the displayed first portion of the respective digital image occupied by the face, each of the concurrent zoomed views displaying a scaled representation of the first portion of the respective digital image without generating a derivative image or altering the respective digital image;
   receiving a second user input; and in response to receiving the second user input, switching to automatically present, on the user interface, other concurrent zoomed views of the two or more digital images, such that each of the other concurrent zoomed views is presented to display an enlarged representation of a second portion of the respective digital image including an instance of the second face, each of the other concurrent zoomed views presented at a different zoom-level that is selected to maximize the fraction of the displayed second portion of the digital image occupied by the second face, each of the other concurrent zoomed views displaying a scaled representation of the second portion of the respective digital image without generating a derivative image or altering the respective digital image.

12. The method of claim 11, where automatically-presenting concurrent zoomed views of the two or more digital images corresponding to the first face or the second face is based on an instance of the first face or the second face in a particular image of the two or more digital images.

13. The method of claim 12, where the particular image is user specified.

14. The method of claim 12, where the particular image is an image from among the two or more digital images that has a largest quantity of detected faces.

15. A method performed by one or more processes executing on a computer system, the method comprising:
presenting, on a user interface viewable on a display coupled to the computer system, one or more digital images;
receiving user input requesting to zoom into portions of the one or more digital images that have a specified feature; and
in response to receiving the user input and for each of the one or more digital images,
detecting at least one image portion having the specified feature, and
automatically presenting, on the user interface, a zoomed view of the digital image that displays an enlarged representation of the detected image portion having the specified feature, the zoomed view of the digital image covering an entire area of the user interface configured to present the one or more digital images, the zoomed view being presented at a zoom level that is selected to maximize a fraction of the displayed image portion occupied by the specified feature, the zoomed view displaying a scaled representation of the detected image portion without generating a derivative image or altering the digital image.

16. The method of claim 15, where the specified feature includes a focus location of a camera that acquired the one or more digital images.

17. The method of claim 15, where the selected zoom-level is less than or equal to a predetermined zoom-level that is set at 100%.

18. The method of claim 15, where the detected image portion having the specified feature is centered in the zoomed view of the digital image.

19. The method of claim 15, where, for each of the digital images, the zoomed view of the digital image is displayed in a corresponding predetermined region of a user interface.

20. The method of claim 15, where the one or more digital images comprises one image that includes first and second image portions having the specified feature, and the method comprises:

automatically presenting on the user interface a first zoomed view that displays an enlarged representation of the first image portion having the specified feature at a zoom-level that is selected to maximize the fraction of the displayed first image portion occupied by the specified feature, the first zoomed view displaying a scaled representation of the first image portion without generating a derivative image or altering the digital image;
receiving a second user input; and
in response to receiving the second user input, switching from the first zoomed view to automatically presenting on the user interface a second zoomed view of the image that displays an enlarged representation of the second image portion having the specified feature at a different zoom-level that is selected to maximize the fraction of the displayed second image portion occupied by the specified feature, the second zoomed view displaying a scaled representation of the second image portion without generating a derivative image or altering the digital image.

21. The method of claim 15, where the one or more digital images comprises two or more images that are captured independent of one another, each of the two or more images includes first and second image portions having the specified feature, the respective zoomed views of the two or more images are presented concurrently, and the method comprises:
automatically presenting, on the user interface, respective concurrent zoomed views of the two or more images, such that each of the concurrent zoomed views is presented to display an enlarged representation of the first image portion of the respective image having the specified feature at a zoom-level that is selected to maximize the fraction of the displayed first image portion occupied by the specified feature, each of the concurrent zoomed views displaying a scaled representation of the first image portion of the respective image without generating a derivative image or altering the respective digital image;
receiving a second user input; and
in response to receiving the second user input, switching to automatically present, on the user interface, respective other concurrent zoomed views of the two or more images, such that each of the other concurrent zoomed views is presented to display an enlarged representation of the second image portion having the specified feature at a different zoom-level that is selected to maximize the fraction of the displayed second image portion occupied by the specified feature, each of the other concurrent zoomed views displaying a scaled representation of the second image portion of the respective digital image without generating a derivative image or altering the respective digital image.

22. The method of claim 15, where the specified feature includes a predetermined image location.

23. The method of claim 22, where the predetermined image location comprises an image location to which the user zoomed during a previous viewing of the digital image.

24. The method of claim 22, where the predetermined image location comprises any one of the centers of quadrants of the digital image.

25. The method of claim 15, where the specified feature includes an object, and detecting the image portion having the specified feature comprises:
detecting an object depicted in an image of the one or more digital images; and selecting a portion of the digital image bounding the detected object to be the image portion depicting the object.

26. The method of claim 25, where the object comprises a human face.

27. The method of claim 25, where the object comprises a non-human animal face.

28. The method of claim 25, where the object comprises one of a building or a vehicle.

29. A non-transitory computer storage medium encoded with a computer program comprising instructions that, when executed by one or more computers, cause the one or more computers to perform operations comprising:

presenting, on a user interface viewable on a display coupled to a computer system, a digital image;

receiving a user input requesting to zoom in to an image portion of the digital image that includes a specified feature; and in response to receiving the user input, automatically presenting, on the user interface, a zoomed view of the digital image displaying an enlarged representation of an image portion that includes the specified feature, the zoomed view being presented at a zoom-level that is selected to maximize a fraction of the displayed image portion occupied by the specified feature, the zoomed view displaying a scaled representation of the image portion without generating a derivative image or altering the digital image.

30. The medium of claim 29, where the selected zoom-level is no larger than a predetermined zoom-level that is set at 100%.

31. The medium of claim 29, where the enlarged representation of the image portion is centered on the user interface.

32. The medium of claim 29, where the operations comprise detecting the image portion that includes the specified feature upon receiving the user input.

33. The medium of claim 29, where the operations comprise detecting the image portion that includes the specified feature prior to receiving the user input.

\* \* \* \* \*

UNITED STATES PATENT AND TRADEMARK OFFICE
CERTIFICATE OF CORRECTION

PATENT NO.        : 9,715,751 B2
APPLICATION NO.   : 13/182409
DATED             : July 25, 2017
INVENTOR(S)       : Nikhil Bhatt It is certified that error appears in the above-identified patent and that said Letters Patent is hereby corrected as shown below:

In the Claims

Column 27, Line 17-18, replace "automatically-presenting" with -- automatically presenting --.

Signed and Sealed this
Twenty-seventh Day of February, 2018

Andrei Iancu
*Director of the United States Patent and Trademark Office*